(12) United States Patent
Qin et al.

(10) Patent No.: US 8,058,937 B2
(45) Date of Patent: Nov. 15, 2011

(54) SETTING A DISCHARGE RATE AND A CHARGE RATE OF A RELAXATION OSCILLATOR CIRCUIT

(75) Inventors: Zheng Qin, Shanghai (CN); Tao Peng, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 988 days.

(21) Appl. No.: 11/700,314

(22) Filed: Jan. 30, 2007

(65) Prior Publication Data
US 2008/0179112 A1    Jul. 31, 2008

(51) Int. Cl.
*H03K 3/26* (2006.01)
(52) U.S. Cl. ........ 331/111; 345/177; 341/33; 178/18.06
(58) Field of Classification Search .................. 345/177; 341/33; 178/18.06; 331/111
See application file for complete search history.

(56) References Cited

U.S. PATENT DOCUMENTS

| | | | |
|---|---|---|---|
| 3,696,908 A | 10/1972 | Gluck et al. | |
| 3,701,350 A | 10/1972 | Hargreaves et al. | |
| 3,750,113 A | 7/1973 | Cencel | |
| 3,974,332 A | 8/1976 | Abe et al. | |
| 3,979,745 A | 9/1976 | Bishop | |
| 4,087,625 A | 5/1978 | Dym et al. | |
| 4,103,252 A | 7/1978 | Bobick | |
| 4,113,378 A | 9/1978 | Wirtz | |
| 4,157,539 A | 6/1979 | Hunts et al. | |
| 4,163,222 A | 7/1979 | Gove | |
| 4,175,239 A | 11/1979 | Sandler | |
| 4,193,063 A | 3/1980 | Hitt et al. | |
| 4,235,871 A | 11/1980 | Papahadjopoulos et al. | |
| 4,238,711 A | 12/1980 | Wallot | |
| 4,264,903 A | 4/1981 | Bigelow | |
| 4,266,144 A | 5/1981 | Bristol | |
| 4,283,713 A | 8/1981 | Philipp | |
| 4,292,604 A * | 9/1981 | Embree et al. ................. 331/111 |
| 4,293,734 A | 10/1981 | Pepper, Jr. | |
| 4,305,135 A | 12/1981 | Dahl et al. | |
| 4,340,777 A | 7/1982 | De Costa et al. | |
| 4,405,917 A | 9/1983 | Chai | |
| 4,405,918 A | 9/1983 | Wall et al. | |
| 4,438,404 A | 3/1984 | Philipp | |
| 4,475,151 A | 10/1984 | Philipp | |

(Continued)

FOREIGN PATENT DOCUMENTS

EP    0574213 A2    6/1993

(Continued)

OTHER PUBLICATIONS

Ryan Seguine, et al., "Layout Guidelines for PSoC™ CapSense™", Cypress Application Note AN2292, Revision B, Oct. 31, 2005, pp. 1-15.

(Continued)

*Primary Examiner* — Richard Hjerpe
*Assistant Examiner* — Sahlu Okebato

(57) ABSTRACT

An apparatus and method for setting a ratio of a discharge rate to a charge rate for measuring a capacitance on a sensor element of a sensing device. The apparatus may include a sensor element of a sensing device, a relaxation oscillator having a first and a second programmable current source, and a ratio decoder to receive a ratio of a discharge rate to a charge rate, and to set the first and second programmable current sources based on the received ratio.

18 Claims, 15 Drawing Sheets

U.S. PATENT DOCUMENTS

| | | |
|---|---|---|
| 4,495,485 A | 1/1985 | Smith |
| 4,497,575 A | 2/1985 | Philipp |
| 4,550,221 A | 10/1985 | Mabusth |
| 4,586,260 A | 5/1986 | Baxter et al. |
| 4,614,937 A | 9/1986 | Poujois |
| 4,622,437 A | 11/1986 | Bloom et al. |
| 4,659,874 A | 4/1987 | Landmeier |
| 4,680,430 A | 7/1987 | Yoshikawa et al. |
| 4,705,919 A | 11/1987 | Dhawan |
| 4,727,767 A | 3/1988 | Aiki et al. |
| 4,736,097 A | 4/1988 | Philipp |
| 4,736,191 A | 4/1988 | Matzke et al. |
| 4,737,768 A | 4/1988 | Lewiner et al. |
| 4,742,331 A | 5/1988 | Barrow et al. |
| 4,772,874 A | 9/1988 | Hasegawa |
| 4,772,983 A | 9/1988 | Kerber et al. |
| 4,773,024 A | 9/1988 | Faggin et al. |
| 4,802,103 A | 1/1989 | Faggin et al. |
| 4,825,147 A | 4/1989 | Cook et al. |
| 4,831,325 A | 5/1989 | Watson, Jr. |
| 4,876,534 A | 10/1989 | Mead et al. |
| 4,878,013 A | 10/1989 | Andermo |
| 4,879,461 A | 11/1989 | Philipp |
| 4,879,505 A | 11/1989 | Barrow et al. |
| 4,920,399 A | 4/1990 | Hall |
| 4,935,702 A | 6/1990 | Mead et al. |
| 4,940,980 A | 7/1990 | Tice |
| 4,952,757 A | 8/1990 | Purcell et al. |
| 4,953,928 A | 9/1990 | Anderson et al. |
| 4,954,823 A | 9/1990 | Binstead |
| 4,962,342 A | 10/1990 | Mead et al. |
| 4,999,462 A | 3/1991 | Purcell |
| 5,008,497 A * | 4/1991 | Asher ................... 178/18.05 |
| 5,049,758 A | 9/1991 | Mead et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,095,284 A | 3/1992 | Mead |
| 5,097,305 A | 3/1992 | Mead et al. |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,146,106 A | 9/1992 | Anderson et al. |
| 5,160,899 A | 11/1992 | Anderson et al. |
| 5,165,054 A | 11/1992 | Platt et al. |
| 5,166,562 A | 11/1992 | Allen et al. |
| 5,204,549 A | 4/1993 | Platt et al. |
| 5,208,725 A | 5/1993 | Akcasu |
| 5,214,388 A | 5/1993 | Vranish et al. |
| 5,237,879 A | 8/1993 | Speeter |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,281,862 A | 1/1994 | Ma |
| 5,289,023 A | 2/1994 | Mead |
| 5,294,889 A | 3/1994 | Heep et al. |
| 5,303,329 A | 4/1994 | Mead et al. |
| 5,305,017 A | 4/1994 | Gerpheide |
| 5,323,158 A | 6/1994 | Ferguson, Jr. |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,373,245 A | 12/1994 | Vranish et al. |
| 5,374,787 A | 12/1994 | Miller et al. |
| 5,381,515 A | 1/1995 | Platt et al. |
| 5,384,467 A | 1/1995 | Plimon et al. |
| 5,386,219 A | 1/1995 | Greanias et al. |
| 5,408,194 A | 4/1995 | Steinbach et al. |
| 5,412,387 A | 5/1995 | Vincelette et al. |
| 5,424,756 A | 6/1995 | Ho et al. |
| 5,463,388 A | 10/1995 | Boie et al. |
| 5,488,204 A | 1/1996 | Mead et al. |
| 5,495,077 A | 2/1996 | Miller et al. |
| 5,499,026 A | 3/1996 | Liao et al. |
| 5,508,700 A | 4/1996 | Taylor et al. |
| 5,518,078 A | 5/1996 | Tsujioka et al. |
| 5,525,980 A | 6/1996 | Jahier et al. |
| 5,541,580 A | 7/1996 | Gerston et al. |
| 5,541,878 A | 7/1996 | LeMoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,572,205 A | 11/1996 | Caldwell et al. |
| 5,629,891 A | 5/1997 | LeMoncheck et al. |
| 5,646,377 A | 7/1997 | Oda |
| 5,648,642 A | 7/1997 | Miller et al. |
| 5,670,915 A | 9/1997 | Cooper et al. |
| 5,672,959 A | 9/1997 | Der |
| 5,682,032 A | 10/1997 | Philipp |
| 5,684,487 A | 11/1997 | Timko |
| 5,730,165 A | 3/1998 | Philipp |
| 5,748,185 A | 5/1998 | Stephan et al. |
| 5,757,368 A | 5/1998 | Gerpheide et al. |
| 5,763,909 A | 6/1998 | Mead et al. |
| 5,763,924 A | 6/1998 | Lum et al. |
| 5,767,457 A | 6/1998 | Gerpheide et al. |
| 5,796,183 A | 8/1998 | Hourmand |
| 5,812,698 A | 9/1998 | Platt et al. |
| 5,841,078 A | 11/1998 | Miller et al. |
| 5,844,265 A | 12/1998 | Mead et al. |
| 5,844,506 A | 12/1998 | Binstead |
| 5,854,625 A | 12/1998 | Frisch et al. |
| 5,856,822 A | 1/1999 | Du et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,869,790 A | 2/1999 | Shigetaka et al. |
| 5,880,411 A | 3/1999 | Gillespie et al. |
| 5,889,236 A | 3/1999 | Gillespie et al. |
| 5,914,465 A | 6/1999 | Allen et al. |
| 5,914,708 A | 6/1999 | LaGrange et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,969,513 A | 10/1999 | Clark |
| 5,996,100 A | 11/1999 | Noble et al. |
| 6,023,422 A | 2/2000 | Allen et al. |
| 6,025,726 A | 2/2000 | Gershenfeld et al. |
| 6,028,271 A | 2/2000 | Gillespie et al. |
| 6,028,959 A | 2/2000 | Wang et al. |
| 6,037,929 A | 3/2000 | Ogura et al. |
| 6,037,930 A | 3/2000 | Wolfe et al. |
| 6,060,957 A * | 5/2000 | Kodrnja et al. ................ 331/143 |
| 6,067,019 A | 5/2000 | Scott |
| 6,097,432 A | 8/2000 | Mead et al. |
| 6,145,850 A | 11/2000 | Rehm |
| 6,147,680 A | 11/2000 | Tareev |
| 6,148,104 A | 11/2000 | Wang et al. |
| 6,184,871 B1 | 2/2001 | Teres et al. |
| 6,185,450 B1 | 2/2001 | Seguine et al. |
| 6,188,228 B1 | 2/2001 | Philipp |
| 6,188,391 B1 | 2/2001 | Seely et al. |
| 6,191,723 B1 * | 2/2001 | Lewis ........................ 341/166 |
| 6,222,522 B1 | 4/2001 | Mathews et al. |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,271,719 B1 | 8/2001 | Sevastopoulos |
| 6,271,720 B1 | 8/2001 | Sevastopoulos |
| 6,271,835 B1 | 8/2001 | Hoeksma |
| 6,280,391 B1 | 8/2001 | Olson et al. |
| 6,288,707 B1 | 9/2001 | Philipp |

| Patent | Type | Date | Inventor |
|---|---|---|---|
| 6,295,052 | B1 | 9/2001 | Kato et al. |
| 6,297,811 | B1 | 10/2001 | Kent et al. |
| 6,304,014 | B1 | 10/2001 | England et al. |
| 6,310,611 | B1 | 10/2001 | Caldwell |
| 6,320,184 | B1 | 11/2001 | Winklhofer et al. |
| 6,320,282 | B1 | 11/2001 | Caldwell |
| 6,323,546 | B2 | 11/2001 | Westerman et al. |
| 6,323,846 | B1 | 11/2001 | Westerman et al. |
| 6,326,859 | B1 | 12/2001 | Goldman et al. |
| 6,342,817 | B1 | 1/2002 | Crofts et al. |
| 6,344,773 | B1 | 2/2002 | Sevastopoulos et al. |
| 6,353,200 | B1 | 3/2002 | Schwankhart |
| 6,366,099 | B1 | 4/2002 | Reddi |
| 6,377,009 | B1 | 4/2002 | Philipp |
| 6,377,129 | B1 | 4/2002 | Rhee et al. |
| 6,380,929 | B1 | 4/2002 | Platt |
| 6,380,931 | B1 | 4/2002 | Gillespie et al. |
| 6,414,671 | B1 | 7/2002 | Gillespie et al. |
| 6,424,338 | B1 | 7/2002 | Anderson |
| 6,429,857 | B1 | 8/2002 | Masters et al. |
| 6,430,305 | B1 | 8/2002 | Decker |
| 6,441,073 | B1 | 8/2002 | Tanaka et al. |
| 6,441,682 | B1 | 8/2002 | Vinn et al. |
| 6,445,257 | B1 | 9/2002 | Cox et al. |
| 6,448,911 | B1 | 9/2002 | Somayajula |
| 6,452,514 | B1 | 9/2002 | Philipp |
| 6,457,355 | B1 | 10/2002 | Philipp |
| 6,459,321 | B1 | 10/2002 | Belch |
| 6,466,036 | B1 | 10/2002 | Philipp |
| 6,473,069 | B1 | 10/2002 | Gerpheide |
| 6,489,899 | B1 | 12/2002 | Ely et al. |
| 6,490,203 | B1 | 12/2002 | Tang |
| 6,498,720 | B2 | 12/2002 | Glad |
| 6,499,359 | B1 | 12/2002 | Washeleski et al. |
| 6,504,530 | B1 | 1/2003 | Wilson et al. |
| 6,522,083 | B1 | 2/2003 | Roach |
| 6,522,128 | B1 | 2/2003 | Ely et al. |
| 6,522,187 | B1 | 2/2003 | Sousa |
| 6,523,416 | B2 | 2/2003 | Takagi et al. |
| 6,534,970 | B1 | 3/2003 | Ely et al. |
| 6,535,200 | B2 | 3/2003 | Philipp |
| 6,570,557 | B1 | 5/2003 | Westerman et al. |
| 6,574,095 | B2 | 6/2003 | Suzuki |
| 6,577,140 | B1 | 6/2003 | Wenman |
| 6,583,632 | B2 | 6/2003 | Von Basse et al. |
| 6,587,093 | B1 | 7/2003 | Shaw et al. |
| 6,597,347 | B1 | 7/2003 | Yasutake |
| 6,610,936 | B2 | 8/2003 | Gillespie et al. |
| 6,614,313 | B2 | 9/2003 | Crofts et al. |
| 6,624,640 | B2 | 9/2003 | Lund et al. |
| 6,639,586 | B2 | 10/2003 | Gerpheide |
| 6,642,857 | B1 | 11/2003 | Schediwy et al. |
| 6,649,924 | B1 | 11/2003 | Philipp et al. |
| 6,667,740 | B2 | 12/2003 | Ely et al. |
| 6,673,308 | B2 | 1/2004 | Hino et al. |
| 6,677,932 | B1 | 1/2004 | Westerman |
| 6,680,731 | B2 | 1/2004 | Gerpheide et al. |
| 6,683,462 | B2 | 1/2004 | Shimizu |
| 6,700,392 | B2 | 3/2004 | Haase |
| 6,704,005 | B2 | 3/2004 | Kato et al. |
| 6,705,511 | B1 | 3/2004 | Dames et al. |
| 6,714,817 | B2 | 3/2004 | Daynes et al. |
| 6,730,863 | B1 | 5/2004 | Gerpheide et al. |
| 6,750,852 | B2 | 6/2004 | Gillespie et al. |
| 6,762,752 | B2 | 7/2004 | Perski et al. |
| 6,774,644 | B2 | 8/2004 | Eberlein |
| 6,781,577 | B2 | 8/2004 | Shigetaka |
| 6,788,221 | B1 | 9/2004 | Ely et al. |
| 6,788,521 | B2 | 9/2004 | Nishi |
| 6,798,218 | B2 | 9/2004 | Kasperkovitz |
| 6,806,693 | B1 * | 10/2004 | Bron .......................... 323/280 |
| 6,809,275 | B1 | 10/2004 | Cheng et al. |
| 6,825,673 | B1 | 11/2004 | Yamaoka |
| 6,825,890 | B2 | 11/2004 | Matsufusa |
| 6,838,887 | B2 | 1/2005 | Denen et al. |
| 6,847,706 | B2 | 1/2005 | Bozorgui-Nesbat |
| 6,856,433 | B2 | 2/2005 | Hatano et al. |
| 6,861,961 | B2 | 3/2005 | Sandbach et al. |
| 6,873,203 | B1 | 3/2005 | Latham, II et al. |
| 6,879,215 | B1 | 4/2005 | Roach |
| 6,879,930 | B2 | 4/2005 | Sinclair et al. |
| 6,882,338 | B2 | 4/2005 | Flowers |
| 6,888,536 | B2 | 5/2005 | Westerman et al. |
| 6,888,538 | B2 | 5/2005 | Ely et al. |
| 6,891,531 | B2 | 5/2005 | Lin |
| 6,893,724 | B2 | 5/2005 | Lin et al. |
| 6,903,402 | B2 | 6/2005 | Miyazawa |
| 6,904,570 | B2 | 6/2005 | Foote et al. |
| 6,914,547 | B1 | 7/2005 | Swaroop et al. |
| 6,933,873 | B1 | 8/2005 | Horsley et al. |
| 6,940,291 | B1 * | 9/2005 | Ozick .......................... 324/658 |
| 6,946,853 | B2 | 9/2005 | Gifford et al. |
| 6,947,031 | B2 | 9/2005 | Sandbach et al. |
| 6,949,811 | B2 | 9/2005 | Miyazawa |
| 6,958,594 | B2 | 10/2005 | Redl et al. |
| 6,969,978 | B2 | 11/2005 | Dening |
| 6,970,126 | B1 | 11/2005 | O'Dowd et al. |
| 6,970,160 | B2 | 11/2005 | Mulligan et al. |
| 6,975,123 | B1 | 12/2005 | Malang et al. |
| 6,993,607 | B2 | 1/2006 | Philipp |
| 7,002,557 | B2 | 2/2006 | Iizuka et al. |
| 7,006,078 | B2 | 2/2006 | Kim |
| 7,030,782 | B2 | 4/2006 | Ely et al. |
| 7,030,860 | B1 | 4/2006 | Hsu et al. |
| 7,032,051 | B2 | 4/2006 | Reay et al. |
| 7,046,230 | B2 | 5/2006 | Zadesky et al. |
| 7,050,927 | B2 | 5/2006 | Sinclair et al. |
| 7,068,039 | B2 | 6/2006 | Parker |
| 7,075,316 | B2 | 7/2006 | Umeda et al. |
| 7,078,916 | B2 | 7/2006 | Denison |
| 7,098,675 | B2 | 8/2006 | Inaba et al. |
| 7,109,978 | B2 | 9/2006 | Gillespie et al. |
| 7,119,550 | B2 | 10/2006 | Kitano et al. |
| 7,129,935 | B2 | 10/2006 | Mackey |
| 7,133,140 | B2 | 11/2006 | Lukacs et al. |
| 7,133,793 | B2 | 11/2006 | Ely et al. |
| 7,141,968 | B2 | 11/2006 | Hibbs et al. |
| 7,141,987 | B2 | 11/2006 | Hibbs et al. |
| 7,151,276 | B2 | 12/2006 | Gerlach et al. |
| 7,151,528 | B2 | 12/2006 | Taylor et al. |
| 7,158,125 | B2 | 1/2007 | Sinclair et al. |
| 7,202,855 | B2 | 4/2007 | Shigetaka et al. |
| 7,202,857 | B2 | 4/2007 | Hinckley et al. |
| 7,202,859 | B1 | 4/2007 | Speck et al. |
| 7,212,189 | B2 | 5/2007 | Shaw et al |
| 7,239,302 | B2 | 7/2007 | Kim |
| 7,253,643 | B1 | 8/2007 | Seguine |
| 7,271,608 | B1 | 9/2007 | Vermeire et al. |
| 7,288,946 | B2 | 10/2007 | Hargreaves et al. |
| 7,288,977 | B2 | 10/2007 | Stanley |
| 7,298,124 | B2 | 11/2007 | Kan et al. |
| 7,301,351 | B2 | 11/2007 | Deangelis et al. |
| 7,307,485 | B1 | 12/2007 | Snyder et al. |
| 7,327,352 | B2 | 2/2008 | Keefer et al. |
| 7,359,816 | B2 | 4/2008 | Kumar et al. |
| 7,362,244 | B2 | 4/2008 | Sun |
| 7,362,313 | B2 | 4/2008 | Geaghan et al. |
| 7,375,535 | B1 | 5/2008 | Kutz et al. |
| 7,381,031 | B2 | 6/2008 | Kawaguchi et al. |
| 7,382,139 | B2 | 6/2008 | Mackey |
| 7,423,635 | B2 | 9/2008 | Taylor et al. |
| 7,439,962 | B2 | 10/2008 | Reynolds et al. |
| 7,446,300 | B2 | 11/2008 | Silvestre |
| 7,450,113 | B2 | 11/2008 | Gillespie et al. |
| 7,466,307 | B2 | 12/2008 | Trent et al. |
| 7,479,788 | B2 | 1/2009 | Bolender et al. |
| 7,479,949 | B2 | 1/2009 | Jobs et al. |
| 7,495,659 | B2 | 2/2009 | Marriott et al. |
| 7,499,040 | B2 | 3/2009 | Zadesky et al. |
| 7,504,833 | B1 | 3/2009 | Seguine |
| 7,532,205 | B2 | 5/2009 | Gillespie et al. |
| 7,539,513 | B2 | 5/2009 | Cathey et al. |
| 7,548,073 | B2 | 6/2009 | Mackey |
| 7,576,732 | B2 | 8/2009 | Lii |
| 7,598,822 | B2 | 10/2009 | Rajagopal et al. |
| 7,614,008 | B2 | 11/2009 | Ording |
| 7,635,828 | B2 | 12/2009 | Finley et al. |
| 7,656,392 | B2 | 2/2010 | Bolender |

| | | |
|---|---|---|
| 7,663,607 B2 | 2/2010 | Hotelling et al. |
| 7,710,397 B2 | 5/2010 | Krah et al. |
| 7,719,522 B2 | 5/2010 | Lyon et al. |
| 7,728,377 B2 | 6/2010 | Elsass et al. |
| 7,730,401 B2 | 6/2010 | Gillespie et al. |
| 7,760,187 B2 | 7/2010 | Kennedy |
| 7,821,274 B2 | 10/2010 | Philipp |
| 7,821,425 B2 | 10/2010 | Philipp |
| 7,840,912 B2 | 11/2010 | Elias et al. |
| 2002/0030666 A1* | 3/2002 | Philipp .................. 345/168 |
| 2002/0063688 A1 | 5/2002 | Shaw et al. |
| 2002/0136371 A1 | 9/2002 | Bozorgui-Nesbat |
| 2003/0014239 A1 | 1/2003 | Ichbiah et al. |
| 2003/0062889 A1 | 4/2003 | Ely et al. |
| 2003/0064326 A1 | 4/2003 | Yamamoto et al. |
| 2003/0080755 A1 | 5/2003 | Kobayashi |
| 2003/0091220 A1 | 5/2003 | Sato et al. |
| 2004/0017355 A1 | 1/2004 | Shim |
| 2004/0178989 A1 | 9/2004 | Shahoian et al. |
| 2004/0217945 A1 | 11/2004 | Miyamoto et al. |
| 2004/0239616 A1 | 12/2004 | Collins |
| 2005/0023145 A1 | 2/2005 | Cohen et al. |
| 2005/0024341 A1 | 2/2005 | Gillespie et al. |
| 2005/0031175 A1 | 2/2005 | Hara et al. |
| 2005/0052429 A1 | 3/2005 | Philipp |
| 2005/0088417 A1 | 4/2005 | Mulligan et al. |
| 2005/0159126 A1 | 7/2005 | Wang |
| 2005/0179668 A1 | 8/2005 | Edwards |
| 2005/0231487 A1 | 10/2005 | Ming |
| 2006/0016800 A1 | 1/2006 | Paradiso et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033508 A1 | 2/2006 | Lee |
| 2006/0033724 A1 | 2/2006 | Chaudhri et al. |
| 2006/0066582 A1 | 3/2006 | Lyon et al. |
| 2006/0066585 A1 | 3/2006 | Lin |
| 2006/0097991 A1 | 5/2006 | Hotelling et al. |
| 2006/0097992 A1 | 5/2006 | Gitzinger et al. |
| 2006/0197750 A1 | 9/2006 | Kerr et al. |
| 2006/0197752 A1 | 9/2006 | Hurst et al. |
| 2006/0197753 A1 | 9/2006 | Hotelling |
| 2006/0227117 A1 | 10/2006 | Proctor |
| 2006/0232559 A1 | 10/2006 | Chien et al. |
| 2006/0258390 A1 | 11/2006 | Cui et al. |
| 2006/0262101 A1 | 11/2006 | Layton et al. |
| 2006/0273804 A1 | 12/2006 | Delorme et al. |
| 2007/0008299 A1 | 1/2007 | Hristov |
| 2007/0063876 A1 | 3/2007 | Wong |
| 2007/0074913 A1 | 4/2007 | Geaghan et al. |
| 2007/0076897 A1 | 4/2007 | Philipp |
| 2007/0132737 A1 | 6/2007 | Mulligan et al. |
| 2007/0152983 A1 | 7/2007 | McKillop et al. |
| 2007/0176903 A1 | 8/2007 | Dahlin et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0236475 A1 | 10/2007 | Wherry |
| 2007/0236618 A1 | 10/2007 | Maag et al. |
| 2007/0247431 A1 | 10/2007 | Skillman et al. |
| 2007/0247443 A1 | 10/2007 | Philipp |
| 2007/0257894 A1 | 11/2007 | Philipp |
| 2007/0262962 A1 | 11/2007 | XiaoPing et al. |
| 2007/0263191 A1 | 11/2007 | Shibazaki |
| 2007/0268265 A1 | 11/2007 | XiaoPing |
| 2007/0273659 A1 | 11/2007 | XiaoPing et al. |
| 2007/0273660 A1 | 11/2007 | XiaoPing et al. |
| 2007/0291013 A1 | 12/2007 | Won |
| 2007/0296709 A1 | 12/2007 | GuangHai |
| 2008/0001926 A1 | 1/2008 | XiaoPing et al. |
| 2008/0007434 A1 | 1/2008 | Hristov |
| 2008/0007534 A1 | 1/2008 | Peng et al. |
| 2008/0024455 A1 | 1/2008 | Lee et al. |
| 2008/0036473 A1 | 2/2008 | Jansson |
| 2008/0041640 A1 | 2/2008 | Gillespie et al. |
| 2008/0048997 A1 | 2/2008 | Gillespie et al. |
| 2008/0084400 A1 | 4/2008 | Rosenberg |
| 2008/0088602 A1 | 4/2008 | Hotelling |
| 2008/0111714 A1 | 5/2008 | Kremin |
| 2008/0122796 A1 | 5/2008 | Jobs et al. |
| 2008/0165132 A1 | 7/2008 | Weiss et al. |
| 2008/0165140 A1 | 7/2008 | Christie et al. |
| 2008/0165141 A1 | 7/2008 | Christie |
| 2008/0165255 A1 | 7/2008 | Christie et al. |
| 2008/0179112 A1 | 7/2008 | Qin et al. |
| 2008/0192005 A1 | 8/2008 | Elgoyhen et al. |
| 2008/0204426 A1 | 8/2008 | Hotelling et al. |
| 2008/0264699 A1 | 10/2008 | Chang et al. |
| 2008/0266263 A1 | 10/2008 | Motaparti et al. |
| 2008/0316183 A1 | 12/2008 | Westerman et al. |

FOREIGN PATENT DOCUMENTS

| | | |
|---|---|---|
| GB | 05/000604 B2 | 9/2005 |
| WO | WO 00/02188 A1 | 1/2000 |

OTHER PUBLICATIONS

Dennis Seguine, "Capacitive Switch Scan", Cypress Application Note AN2233a, Revision B, Apr. 14, 2005, pp. 1-6.

Dave Van Ess, "Understanding Switched Capacitor Analog Blocks", Cypress Application Note AN2041, Revision B, Mar. 30, 2004, pp. 1-16.

Mark Lee, "CapSense Best Practices", Cypress Application Note AN2394, Rev.**, Oct. 19, 2006, pp. 1-10.

CSR User Module Data Sheet, CSR v1.0, CY8C21x34 Data Sheet, Oct. 6, 2006, pp. 1-36.

CSD User Module Data Sheet, CSD v1.0, Oct. 23, 2006, pp. 1-58.

USPTO Notice of Allowance for U.S. Appl. No. 11/395,417 dated Nov. 6, 2008; 7 pages.

USPTO Non-Final Rejection for U.S. Appl. No. 11/395,417 dated Apr. 25, 2008; 7 pages.

USPTO Non-Final Rejection for U.S. Appl. No. 11/395,417 dated Nov. 1, 2007; 8 pages.

USPTO Advisory Action for U.S. Appl. No. 11/395,417 dated Jul. 6, 2007; 3 pages.

USPTO Final Rejection for U.S. Appl. No. 11/395,417 dated Apr. 24, 2007; 9 pages.

USPTO Non-Final Rejection for U.S. Appl. No. 11/395,417 dated Oct. 26, 2006; 13 pages.

USPTO Non-Final Rejection for U.S. Appl. No. 11/395,417 dated Oct. 29, 2009; 8 pages.

The Authoritative Dictionary of IEEE Standards, Terms, 2000, IEEE Press Publications, 7th Edition, pp. 1133-1134; 4 pages.

Seguine, Ryan "Layout guidelines for PSoC(™) CapSense (™)," Cypress Semiconductor Corporation, Application Note AN2292, pp. 1-10, Jul. 22, 2005.

USPTO Non-Final Rejection for U.S. Appl. No. 11/600,896 dated May 14, 2010; 15 pages.

USPTO Non-Final Rejection for U.S. Appl. No. 11/600,896 dated Dec. 16, 2009; 13 pages.

CY8C21x34 Data Sheet, Cypress Semiconductor Corporation, CSR User Module, CSR v1.0, Oct. 6, 2005, pp. 1-36.

USPTO Non-Final Rejection for U.S. Appl. No. 11/437,507 dated Feb. 23, 2009; 9 pages.

USPTO Notice of Allowance for U.S. Appl. No. 11/489,944 dated May 24, 2007; 2 pages.

USPTO Advisory Action for U.S. Appl. No. 11/437,517 dated Apr. 7, 2010; 3 pages.

USPTO Non-Final Rejection for U.S. Appl. No. 11/437,507 dated Oct. 29, 2009; 5 pages.

USPTO Non-Final Rejection for U.S. Appl. No. 11/437,517 dated Aug. 5, 2009; 9 pages.

USPTO Non-Final Rejection for U.S. Appl. No. 11/493,350 dated Jun. 16, 2010; 8 pages.

USPTO Notice of Allowance for U.S. Appl. No. 11/484,085 dated Sep. 17, 2010; 4 pages.

USPTO Notice of Allowance for U.S. Appl. No. 11/484,085 dated Jun. 10, 2010; 4 pages.

USPTO Final Rejection for U.S. Appl. No. 11/484,085 dated Mar. 16, 2010; 7 pages.

USPTO Non-Final Rejection for U.S. Appl. No. 11/484,085 dated Sep. 17, 2009; 8 pages.

USPTO Non-Final Rejection for U.S. Appl. No. 11/395,674 dated Apr. 19, 2010; 15 pages.
USPTO Non-Final Rejection for U.S. Appl. No. 11/395,674 dated Nov. 18, 2009; 11 pages.
USPTO Final Rejection for U.S. Appl. No. 11/395,674 dated Jul. 16, 2009 12 pages.
USPTO Non-Final Rejection for U.S. Appl. No. 11/395,674 dated Feb. 10, 2009; 10 pages.
USPTO Final Rejection for U.S. Appl. No. 11/432,130 dated Jul. 19, 2010; 15 pages.
USPTO Non-Final Rejection for U.S. Appl. No. 11/432,130 dated Mar. 24, 2010; 15 pages.
USPTO Final Rejection for U.S. Appl. No. 11/432,130 dated Nov. 30, 2009; 15 pages.
USPTO Non-Final Rejection for U.S. Appl. No. 11/432,130 dated Jun. 9, 2009; 14 pages.
USPTO Requirement for Restriction/Election for U.S. Appl. No. 11/432,130 dated Mar. 31, 2009; 6 pages.
Chris Mack, "Semiconductor Lithography—The Basic Process," Gentleman Scientist, downloaded Apr. 20, 2006, <http://www.lithoguru.com/scientist/lithobasics.html>; 12 pages.
Wikipedia, the free encyclopedia, "Photolithography," downloaded Apr. 20, 2006, <http://en.wikipedia.org/wiki/Photolithography>; 3 pages.
USPTO Notice of Allowance for U.S. Appl. No. 11/396,179 dated May 20, 2010; 11 pages.
USPTO Notice of Allowance for U.S. Appl. No. 11/396,179 dated Oct. 8, 2009; 7 pages.
USPTO Non-Final Rejection for U.S. Appl. No. 11/396,179 dated Mar. 19, 2009; 25 pages.
USPTO Requirement for Restriction/Election for U.S. Appl. No. 11/396,179 dated Feb. 3, 2009; 6 pages.
USPTO Notice of Allowance for U.S. Appl. No. 11/440,924 dated Jul. 9, 2010; 6 pages.
USPTO Non-Final Rejection for U.S. Appl. No. 11/440,924 dated Jan. 20, 2010; 9 pages.
USPTO Notice of Allowance for U.S. Appl. No. 11/440,924 dated Sep. 23, 2009; 6 pages.
USPTO Non-Final Rejection for U.S. Appl. No. 11/440,924 dated Mar. 10, 2009; 9 pages.
"IBM PC Keyboard," Wikipedia, The Free Encyclopedia, <http://en.wikipedia.org/wiki/PC_keyboard>, downloaded May 19, 2006; 3 pages.
USPTO Non-Final Rejection for U.S. Appl. No. 11/480,016 dated Mar. 17, 2010; 17 pages.
USPTO Advisory Action for U.S. Appl. No. 11/480,016 dated Jan. 29, 2010; 3 pages.
USPTO Final Rejection for U.S. Appl. No. 11/480,016 dated Nov. 19, 2009; 16 pages.
USPTO Non-Final Rejection for U.S. Appl. No. 11/480,016 dated Apr. 10, 2009; 14 pages.
Hal Philipp, "Charge Transfer Sensing," Spread Spectrum Sensor Technology Blazes New Applications, 1997; 9 pages.
USPTO Final Rejection for U.S. Appl. No. 11/437,507 dated Apr. 15, 2010; 5 pages.
USPTO Final Rejection for U.S. Appl. No. 11/437,507 dated Nov. 14, 2008; 8 pages.
USPTO Final Rejection for U.S. Appl. No. 11/442,044 dated Sep. 28, 2009; 13 pages.
USPTO Non-Final Rejection for U.S. Appl. No. 11/437,507 dated Apr. 8, 2008; 5 pages.
USPTO Advisory Action for U.S. Appl. No. 11/437,507 dated Jul. 12, 2010; 2 pages.
USPTO Final Rejection for U.S. Appl. No. 11/442,044 dated Jun. 7, 2010; 17 pages.
USPTO Non-Final Rejection for U.S. Appl. No. 11/442,044 dated Jan. 22, 2010; 15 pages.
USPTO Advisory Action for U.S. Appl. No. 11/442,044 dated Dec. 9, 2009; 2 pages.
USPTO Non-Final Rejection for U.S. Appl. No. 11/442,212 dated Jul. 6, 2010; 13 pages.
USPTO Advisory Action for U.S. Appl. No. 11/442,212 dated Feb. 17, 2009; 3 pages.
USPTO Final Rejection for U.S. Appl. No. 11/442,044 dated Oct. 2, 2009; 12 pages.
USPTO Non-Final Rejection for U.S. Appl. No. 11/442,044 dated Mar. 31, 2009; 12 pages.
USPTO Non-Final Rejection for U.S. Appl. No. 11/442,044 dated Mar. 13, 2009; 11 pages.
USPTO Non-Final Rejection for U.S. Appl. No. 11/343,402 dated Mar. 17, 2010; 11 pages.
USPTO Final Rejection for U.S. Appl. No. 11/343,402 dated Nov. 30, 2009; 12 pages.
USPTO Non-Final Rejection for U.S. Appl. No. 11/343,402 dated Apr. 1, 2009; 11 pages.
USPTO Requirement for Restriction/Election for U.S. Appl. No. 11/343,402 dated Dec. 15, 2008; 6 pages.
Cypress Semiconductor Corporation, "PSoC CY8C20x34 Technical Reference Manual (TRM)," PSoC CY8C20x34 TRM, Version 1.0, 2006; 220 pages.
Cypresss Semiconductor Corporation, "Release Notes sm017," Jan. 24, 2007; 3 pages.
Van Ess, David; "Simulating a 555 Timer with PSoC," Cypress Semiconductor Corporation, Application Note AN2286, May 19, 2005; 10 pages.
Cypress Semiconductor Corporation, "FAN Controller CG6457AM and CG6462AM," PSoC Mixed Signal Array Preliminary Data Sheet; May 24, 2005; 25 pages.
Cypress Semiconductor Corporation, "PSoC Mixed-Signal Controllers, " Producation Description; <http://www.cypress.com/protal/server>; retrieved on Sep. 27,2005; 2 pages.
USPTO Notice of Allowance for U.S. Appl. No. 11/437,518 dated Feb. 23, 2010; 6 pages.
USPTO Non-Final Rejection for U.S. Appl. No. 11/437,518 dated Aug. 18, 2009; 10 pages.
USPTO Requirement for Restriction/Election for U.S. Appl. No. 11/437,518 dated Apr. 21, 2009; 6 pages.
USPTO Non-Final Rejection for U.S. Appl. No. 11/496,991 dated May 24, 2010; 16 pages.
USPTO Notice of Allowance for U.S. Appl. No. 11/496,991 dated Jan. 29, 2010; 6 pages.
USPTO Final Rejection for U.S. Appl. No. 11/496,991 dated Nov. 17, 2009; 17 pages.
USPTO Non-Final Rejection for U.S. Appl. No. 11/496,991 dated Jul. 31, 2009; 15 pages.
USPTO Non-Final Rejection for U.S. Appl. No. 11/395,674 dated Aug. 27, 2010; 15 pages.
USPTO Final Rejection for U.S. Appl. No. 11/605,819 dated Feb. 2, 2010; 15 pages.
USPTO Non-Final Rejection for U.S. Appl. No. 11/605,819 dated Aug. 11, 2009; 12 pages.
USPTO Advisory Action for U.S. Appl. No. 11/605,506 dated Apr. 12, 2010; 3 pages.
USPTO Final Rejection for U.S. Appl. No. 11/605,506 dated Feb. 3, 2010; 14 pages.
USPTO Non-Final Rejection for U.S. Appl. No. 11/605,506 dated Aug. 11, 2009; 11 pages.
Seguine, Ryan and Mark lee, "Layout Guidelines for PSoC CapSense", Cypress Perform, Oct. 31, 2005, 15 pages.
Seguine, Dennis, "Capacitive Switch Scan", Cypress Semiconductor Corporation, Apr. 14, 2005, 6 pages.
USPTO Notice of Allowance for U.S. Appl. No. 11/273,708 dated Aug. 9, 2007; 4 pages.
USPTO Final Rejection for U.S. Appl. No. 11/273,708 dated Jul. 5, 2007; 8 pages.
USPTO Non-Final Rejection for U.S. Appl. No. 11/273,708 dated Mar. 19, 2007; 16 pages.
Sedra, Adel S. et al., "Microelectronic Circuits," 3rd Edition, Oxford University Press, pp. xiii-xx and 861-883, 1991.
Van Ess, David, "Simulating a 555 Timer with PSoC(™)," Cypress Semiconductor Corporation, Application Note AN2286, pp. 1-10, May 19, 2005.
Cypress Semiconductor Corporation, "Fan Controller CG6457AM," PSoC(™) Mixed-Signal Array Preliminary Data Sheet, pp. 1-25, May 24, 2005.

Cypress Semiconductor corporation, "PsoC Mixed-Signal Controllers," ProductDescription, pp. 1-2, http://www.cypress.com/portal/server.pt?space=CommunityPage&control=SetCommunity&CommunityID=209&PageID=215&gid=13fid=24&category=false. (Sep. 27, 2005).

Cypress Semiconductor Corporation, "CY8C21x34 Data Sheet," CSR User Module, CSR V.1.0, Oct. 6, 2005, pp. 1-36.

Chapweske, Adam, "The PS/2 Mouse Interface," PS/2 Mouse Interfacing, 2001; 10 pages.

USPTO Final Rejection for U.S. Appl. No. 11/502,267 dated Feb. 3, 2009; 10 pages.

USPTO Non-Final Rejection for U.S. Appl. No. 11/502,267 dated Aug. 11, 2008; 10 pages.

USPTO Notice of Allowance for U.S. Appl. No. 11/729,818 dated Jun. 25, 2010; 7 pages.

USPTO Notice of Allowance for U.S. Appl. No. 11/729,818 dated Feb. 24, 2010; 6 pages.

Cypress Semiconductor Corporation, "Cypress Introduces PSoC(™)-Based Capacitive Touch Sensor Solution", Cypress Press Release, May 31, 2005, http://www.cypress.com/portal/server.pt?space=CommunityPage&control=SetCommunity&CommunityID-2008&PageID=218&DirectoryID=661552 (Retrieved on Feb. 5, 2007).

Lee, Mark, "EMC Design considerations for PsoC(™) CapSense(™) Applications," Cypress Semiconductor Corporation, Application Note AN2318, pp. 1-6, Sep. 16, 2005.

Cypress Semiconductor Corporation, "Release notes sm017," pp. 1-3, Jan. 24, 2007.

Cypress Semiconductor Corporation, "PSoC(R) CY8C20x34 Technical Reference Manual (TRM)," PSoC CY8C20x34 TRM, Version 1.0, pp. 1-218, 2006.

USPTO Notice of Allowance for U.S. Appl. No. 11/729,818 dated Nov. 13, 2009; 7 pages.

USPTO Final Rejection for U.S. Appl. No. 111729,818 dated Jul. 2, 2009; 7 pages.

USPTO Non-Final Rejection for U.S. Appl. No. 11/729,818 dated Dec. 17, 2008; 12 pages.

USPTO Advisory Action for U.S. Appl. No. 11/477,179 dated Jun. 7, 2010; 3 pages.

USPTO Non-Final Rejection for U.S. Appl. No. 11/477,179 dated Jul. 20, 2010; 10 pages.

USPTO Non-Final Rejection for U.S. Appl. No. 11/437,517 dated Aug. 3, 2010; 10 pages.

USPTO Notice of Allowance for U.S. Appl. No. 11/700,314 dated Sep. 16, 2010; 8 pages.

USPTO Final Rejection for U.S. Appl. No. 12/367,279 dated Apr. 1, 2010; 6 pages.

USPTO Advisory Action for U.S. Appl. No. 12/367,279 dated Jun. 25, 2010; 3 pages.

USPTO Notice of Allowance for U.S. Appl. No. 12/367,279 dated Aug. 23, 2010; 7 pages.

USPTO Notice of Allowance for U.S. Appl. No. 11/230,719 dated Jan. 16, 2008; 4 pages.

USPTO Advisory Action for U.S. Appl. No. 11/230,719 dated Nov. 30, 2007; 3 pages.

USPTO Final Rejection for U.S. Appl. No. 11/230,719 dated Sep. 7, 2007; 9 pages.

USPTO Non-Final Rejection for U.S. Appl. No. 11/230,719 dated May 25, 2007; 6 pages.

USPTO Non-Final Rejection for U.S. Appl. No. 11/230,719 dated Jan. 16, 2007; 8 pages.

USPTO Non-Final Rejection for U.S. Appl. No. 11/230,719 dated Aug. 28, 2006; 7 pages.

USPTO Non-Final Rejection for U.S. Appl. No. 11/230,719 dated May 11, 2006; 5 pages.

USPTO Final Rejection for U.S. Appl. No. 11/437,517 dated Jan. 26, 2010; 11 pages.

USPTO Final Rejection for U.S. Appl. No. 11/477,179 dated Apr. 1, 2010; 10 pages.

USPTO Non-Final Rejection for U.S. Appl. No. 11/477,179 dated Nov. 18, 2009; 10 pages.

USPTO Non-Final Rejection for U.S. Appl. No. 11/477,179 dated Jun. 9, 2009; 13 pages.

U.S. Appl. No. 11/493,350: "Technique for Increasing the Sensitivity of Capacitive Sensor Arrays," Lee et al., filed on Jul. 25, 2006; 48 pages.

USPTO Notice of Allowance for U.S. Appl. No. 11/489,944 dated Apr. 9, 2007; 7 pages.

USPTO Non-Final Rejection for U.S. Appl. No. 11/700,314 dated Mar. 26, 2010; 7 pages.

"The Virtual Keyboard: I-Tech Bluetooth/Serial Virtual Laser Keyboard Available Now!" The Virtual Laser Keyboard (VKB) Online Worldwide Shop, <http://www.virtual-laser-keyboard.com> downloaded Apr. 13, 2006; 4 pages.

Wikipedia, The Free Encclopedia, "IBM Pc Keyboard," <http://en.wikipedia.org/wiki/PC_keyboard> accessed May 19, 2006; 3 pages.

USPTO Final Rejection for U.S. Appl. No. 11/600,896 dated Sep. 30, 2010; 19 pages.

USPTO Final Rejection for U.S. Appl. No. 11/477,179 dated Nov. 24, 2010; 10 pages.

USPTO Non-Final Rejection for U.S. Appl. No. 11/493,350 dated Nov. 9, 2010; 9 pages.

USPTO Non-Final Rejection for U.S. Appl. No. 11/432,130 dated Nov. 9, 2010; 13 pages.

USPTO Final Rejection for U.S. Appl. No. 11/442,212 dated Oct. 12, 2010; 13 pages.

USPTO Advisory Action for U.S. Appl. No. 11/480,016 dated Nov. 10, 2010; 3 pages.

USPTO Final Rejection for U.S. Appl. No. 11/480,016 dated Aug. 31, 2010; 19 pages.

USPTO Advisory Action for U.S. Appl. No. 11/442,044 dated Aug. 31, 2010; 2 pages.

Mack, Chris, "Semiconductor Lithography—The Basic Process", Gentleman Scientist, 12 pages, downloaded Apr. 20, 2006, http://www.lithoguru.com/schientis/lithobasics.html; 12 pages.

"Photolithography", Wikipedia, the free encyclopedia, 3 pages, downloaded Apr. 20, 2006, http://en.wikipedia.orglwiki/Photolithography; 3 pages.

U.S. Appl. No. 11/480,016: "Bidirectional Slider," XiaoPing et al.: filed Jun. 29, 2006; 58 pages.

U.S. Appl. No. 11/442,044: "Multi-function slider in touchpad," XiaoPing et al.; filed May 26, 2006; 58 pages.

U.S. Appl. No. 11/442,212: "Multi-function slider in touchpad," XiaoPing; filed May 26, 2006; 57 pages.

Sangil Park, Ph. D., Motorola Digital Signal Processors "Principles of Sigma-Delta Modulation for Analog-to-Digital Converters," APR8/D Rev. 1; Downloaded from <http://digitalsignallabs.com/SigmaDelta.pdf>; 64 pages.

Vladislav Golub, Ph. D., "Sigma-delta ADCs," Jun. 17, 2003; 10 pages.

"Sigma-Delta ADCs and DACs, An-283 Application Note, Analog Devices," 1993; Downloaded from <http://www.analog.com/UpoloadedFiles/Application_Notes/292524291525717245054923680458171AN283.pdf>; 16 pages.

USPTO Non-Final Rejection for U.S. Appl. No. 11/600,896 dated Jan. 26, 2011; 12 pages.

USPTO Advisory Action for U.S. Appl. No. 11/442,212 dated Jan. 5, 2011; 3 pages.

USPTO Non-Final Rejection for U.S. Appl. No. 11/480,016 dated Jan. 26, 2011; 22 pages.

USPTO Notice of Allowance for U.S. Appl. No. 11/442,044 dated Oct. 4, 2010; 9 pages.

USPTO Notice of Allowance for U.S. Appl. No. 11/600,255 dated Jul. 27, 2010; 6 pages.

USPTO Non-Final Rejection for U.S. Appl. No. 11/600,255 dated Mar. 29, 2010; 10 pages.

USPTO Non-Final Rejection for U.S. Appl. No. 11/442,212 dated Feb. 25, 2011; 13 pages.

* cited by examiner

900

Providing a sensor element of a sensing device
901

Setting a ratio of a discharge rate to a charge rate for measuring a capacitance on the sensor element
902

Setting the charging rate for introducing a charge on the sensor element of the sensing device
903

Setting the discharging rate for removing the charge on the sensor element of the sensing device
904

FIG. 9

SETTING A DISCHARGE RATE AND A CHARGE RATE OF A RELAXATION OSCILLATOR CIRCUIT

TECHNICAL FIELD

This invention relates to the field of user interface devices and, in particular, to touch-sensor devices.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

One type of touchpad operates by way of capacitance sensing utilizing capacitive sensors. The capacitance detected by a capacitive sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (SAW—surface acoustic wave) or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point of sale systems, on ATMs, on mobile handsets, on kiosks, on game consoles, and on PDAs where a stylus is sometimes used to manipulate the graphical user interface (GUI) and to enter data.

FIG. 1A illustrates a conventional touch-sensor pad. The touch-sensor pad 100 includes a sensing surface 101 on which a conductive object may be used to position a pointer in the x- and y-axes, using either relative or absolute positioning, or to select an item on a display. Touch-sensor pad 100 may also include two buttons, left and right buttons 102 and 103, respectively, shown here as an example. These buttons are typically mechanical buttons, and operate much like a left and right buttons on a mouse. These buttons permit a user to select items on a display or send other commands to the computing device.

FIG. 1B illustrates a conventional linear touch-sensor slider. The linear touch-sensor slider 110 includes a surface area 111 on which a conductive object may be used to control a setting on a device, such as volume or brightness. Alternatively, the linear touch-sensor slider 110 may be used for scrolling functions. The construct of touch-sensor slider 110 may be the same as that of touch-sensor pad 100. Touch-sensor slider 110 may include a sensor array capable of detection in only one dimension (referred to herein as one-dimensional sensor array). The slider structure may include one or more sensor elements that may be conductive traces. By positioning or manipulating a conductive object in contact or in proximity to a particular portion of the slider structure, the capacitance between each conductive trace and ground varies and can be detected. The capacitance variation may be sent as a signal on the conductive trace to a processing device. It should also be noted that the sensing may be performed in a differential fashion, obviating the need for a ground reference. For example, by detecting the relative capacitance of each sensor element, the position and/or motion (if any) of the external conductive object can be determined. It can be determined which sensor element has detected the presence of the conductive object, and it can also be determined the motion and/or the position of the conductive object over multiple sensor elements.

One difference between touch-sensor sliders and touch-sensor pads may be how the signals are processed after detecting the conductive objects. Another difference is that the touch-sensor slider is not necessarily used to convey absolute positional information of a conducting object (e.g., to emulate a mouse in controlling pointer positioning on a display), but rather relative positional information. However, the touch-sensor slider and touch-sensor pad may be configured to support either relative or absolute coordinates, and/or to support one or more touch-sensor button functions of the sensing device.

FIG. 1C illustrates a conventional sensing device having three touch-sensor buttons. Conventional sensing device 120 includes button 121, button 122, and button 123. These buttons may be capacitive touch-sensor buttons. These three buttons may be used for user input using a conductive object, such as a finger.

In order to detect the presence of a conductive object on either of the above mentioned sensing devices (e.g., touch-sensor pad 100, touch-sensor slider 110, or touch-sensor buttons of sensing device 120), a current source is coupled to the sensing device to provide a charge current to one or more sensor elements of the sensing device. The current source may be part of a relaxation oscillator. The output of the relaxation oscillator may be measured by a digital counter.

One conventional sensing device includes a current source that provides current to the sensing elements of the sensing device to measure the capacitance on the sensing elements.

The conventional sensing device, however, has a fixed value for the current. This fixed value may be a hard coded value in a register programmable current output digital-to-analog converter (DAC) (also known as IDAC). The hard coded value may be stored in a register or in memory of the processing device, which is used to determine the presence and/or position of a conductive object on the sensing device.

Conventional sensing devices that use a hard coded current from the current source of the capacitive circuit can have current or circuit response variations due to chip, system, and/or board manufacturing variations. These current or circuit response variations may result in improper capacitive sensing operations. For example, if the current is too low, it may take the circuit longer to measure the capacitance on the sensing device. Current or circuit response variations may also result in significant failure rate in production quantities due to the manufacturing variations.

FIG. 1D illustrates a varying capacitance sensor element. In its basic form, a capacitance sensor element 130 is a pair of adjacent conductors 131 and 132. There is a small edge-to-edge capacitance, but the intent of sensor element layout is to minimize the parasitic capacitance $C_P$ between these conductors. When a conductive object 133 (e.g., finger) is placed in proximity to the two conductors 131 and 132, there is a capacitance between electrode 131 and the conductive object 133 and a similar capacitance between the conductive object 133 and the other electrode 132. The capacitance between the electrodes when no conductive object 133 is present is the base capacitance $C_P$ that may be stored as a baseline value. There is also a total capacitance ($C_P+C_F$) on the sensor element 130 when the conductive object 133 is present on or in close proximity to the sensor element 130. The baseline capacitance value $C_P$ may be subtracted from the total capacitance when the conductive object 133 is present to determine the change in capacitance (e.g., capacitance variation $C_F$) when the conductive object 133 is present and when the conductive object 133 is not present on the sensor element. Effectively, the capacitance variation $C_F$ can be measured to determine whether a conductive object 133 is present or not (e.g., sensor activation) on the sensor element 130.

Capacitance sensor element 130 may be used in a capacitance sensor array. The capacitance sensor array is a set of capacitors where one side of each capacitor is connected to a system ground 138. When the capacitance sensor element 130 is used in the sensor array, when the conductor 131 is sensed, the conductor 132 is connected to ground, and when the conductor 132 is sensed, the conductor 131 is connected to ground. Alternatively, when the sensor element is used for a touch-sensor button, the sensor element is sensed and the sensed button area is surrounded by a fixed ground. The presence of the conductive object 133 increases the capacitance ($C_P+C_F$) of the sensor element 130 to ground. Determining sensor element activation is then a matter of measuring change in the capacitance ($C_F$) or capacitance variation. Sensor element 130 is also known as a grounded variable capacitor.

The conductive object 133 of FIG. 1D has been illustrated as a finger. Alternatively, this technique may be applied to any conductive object, for example, a conductive door switch, position sensor, or conductive pen in a stylus tracking system (e.g., stylus).

The capacitance sensor element 130 is known as a projected capacitance sensor. Alternatively, the capacitance sensor element 130 may be a surface capacitance sensor that does not make use of rows or columns, but instead makes use of a single linearized field, such as the surface capacitance sensor described in U.S. Pat. No. 4,293,734. The surface capacitance sensor may be used in touch screen applications.

FIG. 1E illustrates a conventional capacitance sensor element 137 coupled to a processing device 110. Capacitance sensor element 137 illustrates the capacitance as seen by the processing device 110 on the capacitance sensing pin 136. As described above, when a conductive object 133 (e.g., finger) is placed in proximity to one of the conductors 135, there is a capacitance, $C_F$, between the one of the conductors 135 and the conductive object 133 with respect to ground. This ground, however, may be a floating ground. Also, there is a capacitance, $C_P$, between the conductors 135, with one of the conductors 135 being connected to a system ground 138. The grounded conductor may be coupled to the processing device 110. The conductors 135 may be metal, or alternatively, the conductors may be conductive ink (e.g., carbon ink), conductive ceramic (e.g., transparent conductors of indium tin oxide (ITO)), or conductive polymers. The grounded conductor may be an adjacent sensor element. Alternatively, the grounded conductor may be other grounding mechanisms, such as a surrounding ground plane. Accordingly, the processing device 110 can measure the change in capacitance, capacitance variation $C_F$, as the conductive object is in proximity to one of the conductors 135. Above and below the conductor that is closest to the conductive object 133 is dielectric material 134. The dielectric material 134 above the conductor 135 can be an overlay, as described in more detail below. The overlay may be non-conductive material used to protect the circuitry from environmental conditions and ESD, and to insulate the user's finger (e.g., conductive object) from the circuitry. Capacitance sensor element 137 may be a sensor element of a touch-sensor pad, a touch-sensor slider, or a touch-sensor button.

One conventional circuit of measuring the change in capacitance introduced by the conductive object is a relaxation oscillator.

FIG. 1F illustrates a conventional relaxation oscillator for measuring capacitance on a sensor element. The relaxation oscillator 150 is formed by the capacitance to be measured on the sensor element, represented as capacitor 151, a charging current source 152, a comparator 153, and a reset switch 154 (also referred to as a discharge switch). It should be noted that capacitor 151 is representative of the capacitance measured on a sensor element of a sensor array. The relaxation oscillator is coupled to drive a charging current (Ic) 157 in a single direction onto a device under test ("DUT") capacitor, capacitor 151. As the charging current piles charge onto the capacitor 151, the voltage across the capacitor increases with time as a function of Ic 157 and its capacitance C. Equation (1) describes the relation between current, capacitance, voltage, and time for a charging capacitor.

$$CdV=I_C dt \qquad (1)$$

The relaxation oscillator begins by charging the capacitor 151, at a fixed current Ic 157, from a ground potential or zero voltage until the voltage across the capacitor 151 at node 155 reaches a reference voltage or threshold voltage, $V_{TH}$ 160. At the threshold voltage $V_{TH}$ 160, the relaxation oscillator allows the accumulated charge at node 155 to discharge (e.g., the capacitor 151 to "relax" back to the ground potential) and then the process repeats itself. In particular, the output of comparator 153 asserts a clock signal $F_{OUT}$ 156 (e.g., $F_{OUT}$ 156 goes high), which enables the reset switch 154. This discharges the capacitor at node 155 to ground and the charge cycle starts again. The relaxation oscillator outputs a relaxation oscillator clock signal ($F_{OUT}$ 156) having a frequency ($f_{RO}$) dependent upon capacitance C of the capacitor 151 and charging current Ic 157.

The comparator trip time of the comparator 153 and reset switch 154 add a fixed delay. The output of the comparator 153 is synchronized with a reference system clock to guarantee that the reset time is long enough to completely discharge capacitor 151. This sets a practical upper limit to the operating frequency. For example, if capacitance C of the capacitor 151 changes, then $f_{RO}$ changes proportionally according to Equation (1). By comparing $f_{RO}$ of $F_{OUT}$ 156 against the frequency ($f_{REF}$) of a known reference system clock signal (REF CLK), the change in capacitance ΔC can be measured. Accordingly, equations (2) and (3) below describe that a change in frequency between $F_{OUT}$ 156 and REF CLK is proportional to a change in capacitance of the capacitor 151.

$$\Delta C \propto \Delta f, \text{ where} \qquad (2)$$

$$\Delta f = f_{RO} - f_{REF}. \qquad (3)$$

A frequency comparator may be coupled to receive relaxation oscillator clock signal ($F_{OUT}$ 156) and REF CLK, compare their frequencies $f_{RO}$ and $f_{REF}$, respectively, and output a signal indicative of the difference Δf between these frequencies. By monitoring Δf one can determine whether the capacitance of the capacitor 151 has changed.

The relaxation oscillator 150 may be built using a programmable timer (e.g., 555 timer) to implement the comparator 153 and reset switch 154. Alternatively, the relaxation oscillator 150 may be built using other circuitry. The capacitor charging current for the relaxation oscillator 150 may be generated in a register programmable current output DAC (also known as IDAC). Accordingly, the current source 152 may be a current DAC or IDAC. The IDAC output current may be set by an 8-bit value provided by the processing device 110, such as from the processing core. The 8-bit value may be stored in a register or in memory.

In many capacitance sensor element designs, the two "conductors" (e.g., 131 and 132) of the sensing capacitor are actually adjacent sensor elements that are electrically isolated (e.g., PCB pads or traces), as indicated in FIG. 1D. Typically, one of these conductors is connected to a system ground 138. Layouts for touch-sensor slider (e.g., linear slide sensor elements) and touch-sensor pad applications have sensor elements that may be immediately adjacent. In these cases, all of the sensor elements that are not active are connected to a system ground 138 of the processing device 110. The actual capacitance between adjacent conductors is small ($C_P$), but the capacitance of the active conductor (and its PCB trace back to the processing device 110) to ground, when detecting the presence of the conductive object 133, may be considerably higher ($C_P + C_F$). The capacitance of two parallel conductors is given by the following equation:

$$C = \varepsilon_0 \cdot \varepsilon_R \cdot \frac{A}{d} = \varepsilon_R \cdot 8.85 \cdot \frac{A}{d} \text{pF/m} \qquad (4)$$

The dimensions of equation (4) are in meters. This is a very simple model of the capacitance. The reality is that there are fringing effects that substantially increase the sensor element-to-ground (and PCB trace-to-ground) capacitance.

As described above with respect to the relaxation oscillator 150, when a finger or conductive object is placed on the sensor element, the capacitance increases from $C_P$ to $C_P + C_F$ so the relaxation oscillator output signal 156 ($F_{OUT}$) decreases in frequency. The relaxation oscillator output signal 156 ($F_{OUT}$) may be fed to a digital counter for measurement. There are two methods for counting the relaxation oscillator output signal 156: frequency measurement and period measurement.

In the conventional relaxation oscillator, the baseline capacitance $C_P$ is with respect to system ground 138, such as of the processing device 110, while the capacitance variation $C_F$ is with respect to a common ground or a floating ground.

Sensing devices with floating grounds are subject to high voltage AC offsets due to the sensing devices power supply, especially when used with AC/DC converters with high leakage or when the sensing device is coupled to the AC line. Capacitive sensor elements may be especially sensitive to this type of periodic noise due to the low currents and capacitance of the sensing device.

FIG. 1G illustrates a graph of the voltage across a sensor element. The voltage Va 161, which is the voltage across the capacitor 151 at node 155. As the voltage Va 161 reaches a threshold voltage $V_{TH}$ 160, the voltage is removed from the node 155, dropping the voltage Va 161 back to ground. As described above, the conventional relaxation oscillator is subject to noise on the system ground. The system ground may be very noisy in comparison to the common ground. Consequently, the frequency of the voltage Va is modulated by the noise, resulting in different charge time periods (t1, t2, and t3) between peaks of the saw-toothed voltage. This may affect sensing the correct capacitance variation $C_F$.

FIG. 1H illustrates two graphs of the output counts for four scans of four buttons on a conventional sensing device with and without alternating current (AC) noise. The presence of a finger or other type of conductive object on the switch may be determined by the difference in counts between a stored value (e.g., baseline or threshold) for no switch actuation and the acquired value with switch actuation. The sensing device can be scanned to measure the capacitance, which is represented by the number of counts. When the counts are measured as being above a "button pressed" or presence threshold, switch activation can be detected. Graph 160 illustrates the counts measured on a conventional sensing device that includes four buttons. Graph 160 illustrates the counts of a first scan of the four buttons (four shaded rectangles) in a row followed by a delay and then their rescan three times (four total scans of the four buttons). The result is that counts of all buttons exceed the 'button pressed' threshold consistently when no AC noise is present. Graph 160 illustrates the counts measured on the conventional sensing device when no or minimal AC noise is present.

Graph 170 illustrates the counts measured on the conventional sensing device when AC noise is present. Similar to Graph 160, Graph 170 illustrates the counts of a first scan of the four buttons (four shaded rectangles) in a row followed by a delay and then their rescan three times (four total scans of the four buttons). Graph 170, however, illustrates the AC noise offsets introduced in the counts measured on the conventional sensing device. The AC noise may be caused due to an AC power adapter that is used to power the sensing device, or alternatively, from other AC power sources. Due to the AC noise, the button counts measured on the conventional sensing device do not consistently cross the "button pressed" or presence threshold.

Conventional sensing devices do not attempt to reduce the AC noise level. Taking a single sample of length t, asynchronous to the AC noise, results in an offset proportional to the AC noise amplitude and polarity at the time of the sample. Because the precise frequency and phase of the AC noise is not known during the sample, the offset appears to be random to the firmware. Because conventional designs perform no reduction in AC noise, the worst case AC induced noise level results in being approximately 5 times the signal level. The characteristic waveform of this worst case (e.g., counts measured including the AC offset) may be similar to that of an object in proximity to the capacitive sensing circuit, meaning the counts may exceed the presence threshold for switch activation. The result is false-positive detections and missed-real detections of the presence of the conductive object, resulting in detection algorithm instability.

BRIEF DESCRIPTION OF THE DRAWINGS

The present invention is illustrated by way of example, and not by way of limitation, in the figures of the accompanying drawings.

FIG. 9 illustrates a flow chart of one embodiment of a method for setting a ratio of a discharge-to-charge rate for measuring a capacitance on the sensor element.

DETAILED DESCRIPTION

Figure 1A:
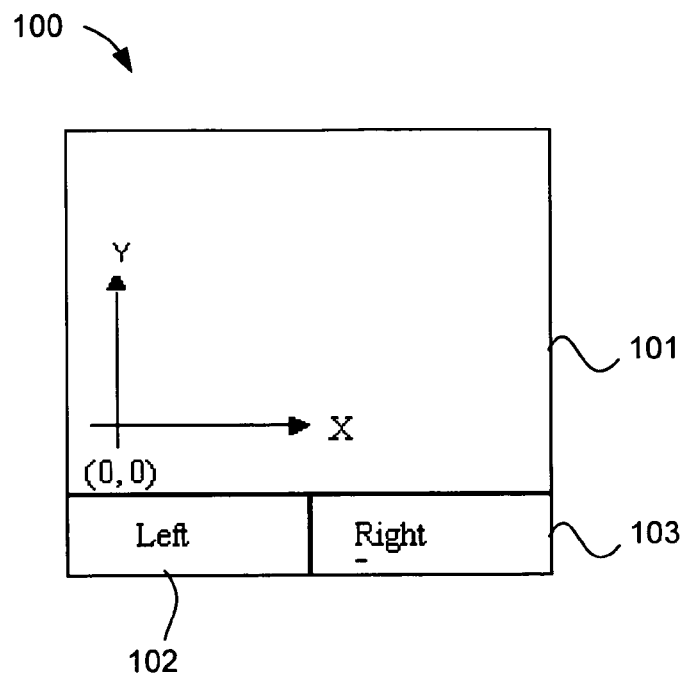
FIG. 1A illustrates a conventional touch-sensor pad.
Figure 1B:
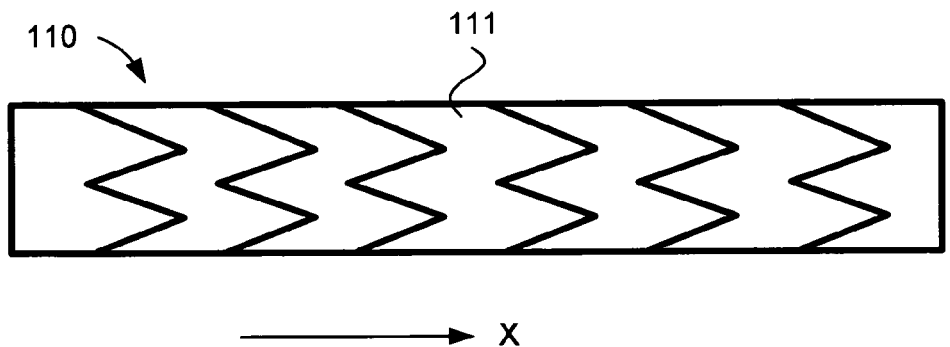
FIG. 1B illustrates a conventional linear touch-sensor slider.
Figure 1C:
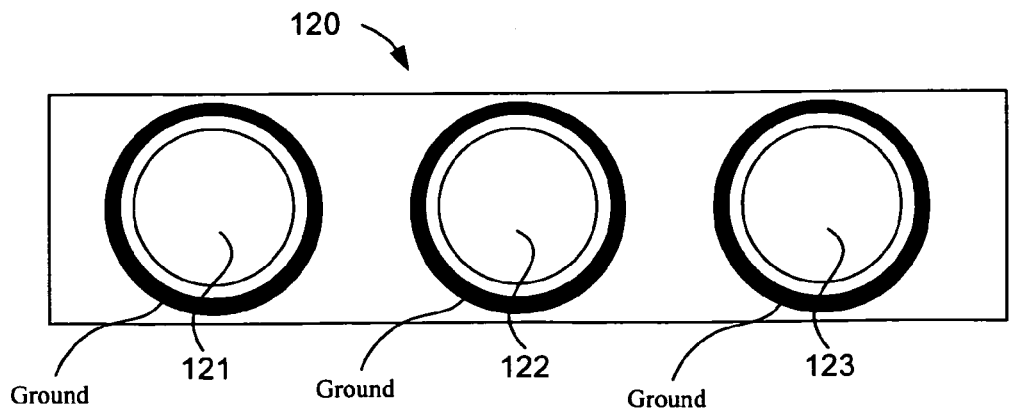
FIG. 1C illustrates a conventional sensing device having three touch-sensor buttons.
Figure 1D:
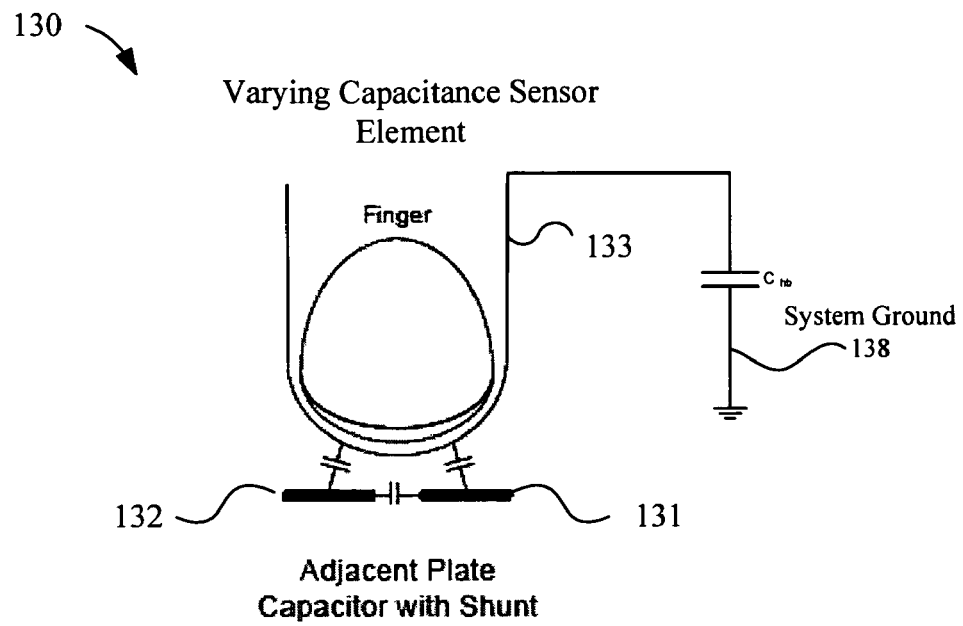
FIG. 1D illustrates a varying capacitance sensor element.
Figure 1E:
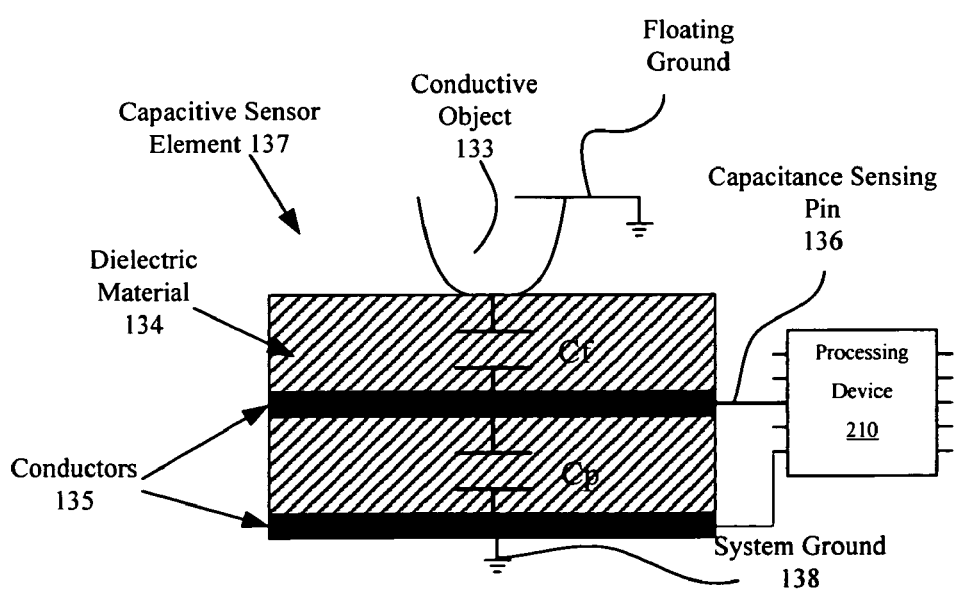
FIG. 1E illustrates a conventional sensor element coupled to a processing device.
Figure 1F:
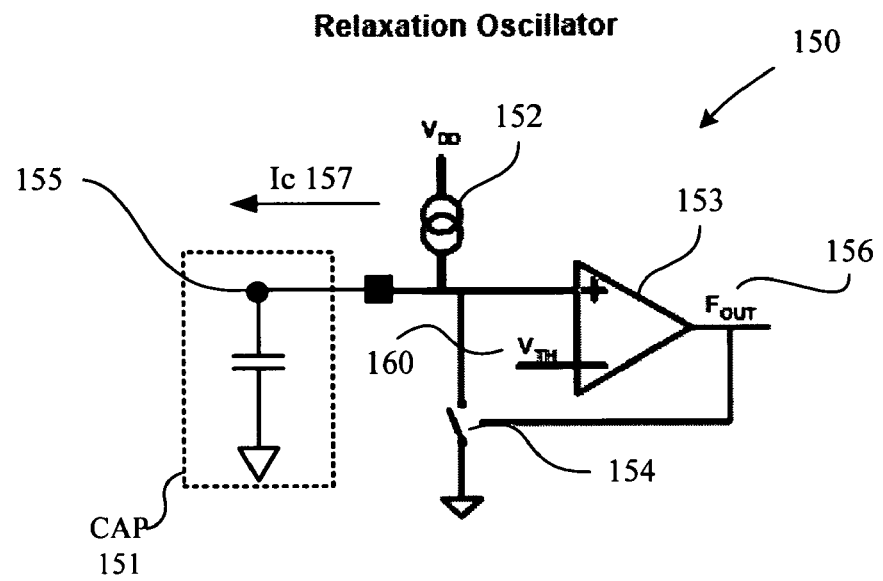
FIG. 1F illustrates a conventional relaxation oscillator for measuring capacitance on a sensor element.

Described herein is an apparatus and method for setting a ratio of a discharge rate to a charge rate for measuring a capacitance on a sensor element. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to set a discharge-to-charge ratio for measuring a capacitance on a sensing device. In one embodiment, the method may include setting a charging rate for introducing a charge on the sensor element of the sensing device, and setting the discharging rate for removing the charge on the sensor element. In one embodiment, the apparatus may include a sensor element, a relaxation oscillator, coupled to the sensor element, having a first programmable current source and a second programmable current source, and a ratio decoder coupled to the first and second programmable current sources. The ratio decoder is configured to receive a ratio of a discharge to a charge rate, and to set the first and second programmable current sources based on the received ratio.

The embodiments described herein are configured to swing the relaxation oscillator's output between two internally-generated voltage levels. The two internally-generated voltage levels are used to reduce the noise and power consumption. Noise may be caused by high voltage AC offsets due to the circuit's power supply, such as a 50 Hz or 60 Hz power source. By setting the ratio of the discharge to charge, the noise may be reduced. Using the architecture of the embodiments described herein, the supply noise, including both power and ground noise may be tolerated. The embodiments described herein are capable of improving the noise immunity of the circuit for the low-frequency supply noise, such as 50 or 60 Hz. By setting both high and low voltage thresholds, the embodiments described herein may reduce the power consumption, which is very important in mobile applications. Also, by setting the charging and discharging rate, the cycle-to-cycle variations of the rise and fall times on the output of the relaxation oscillator may be balanced, as contrasted with the different charging periods of the conventional relaxation oscillator. In one embodiment, the rise and fall times may be approximately equal for a 1:1 discharge to charge ratio. In another embodiment, the discharge to charge ratio may be approximately 1.6:1.0. Alternatively, other ratios may be used.

Figure 1G:
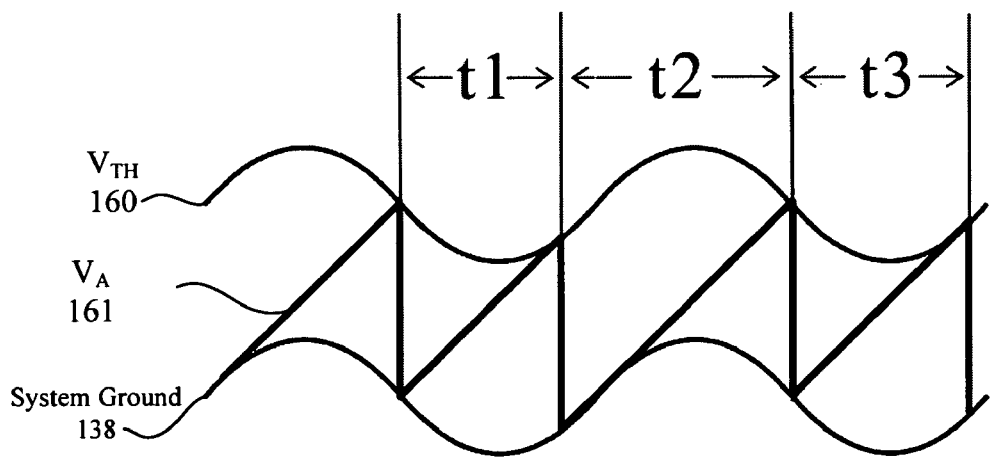
FIG. 1G illustrates a graph of the voltage across a sensor element.
Figure 1H:
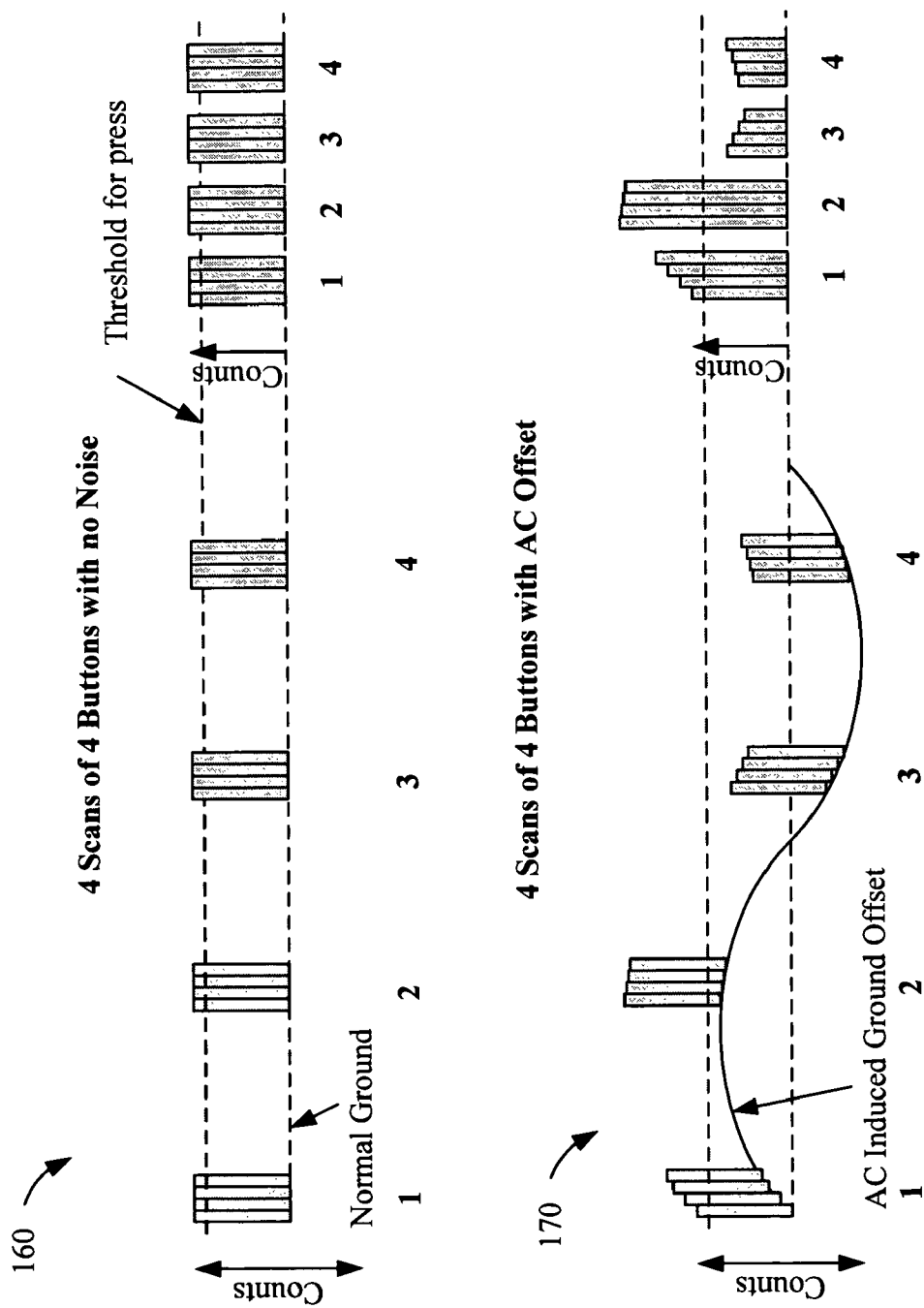
FIG. 1H illustrates two graphs of the output counts for four scans of four buttons on a conventional sensing device with and without alternating current (AC) noise.

The embodiments described herein described a supply noise tolerant relaxation oscillator for touch-sensor applications, such as touch-sensor buttons, sliders, touchpads, touch screens, or the like. These embodiments may be implemented in mobile applications. The ground signal of a 2-pin power plug for mobile applications, introduces low frequency noise, such as 50 or 60 Hz. The susceptibility of the conventional relaxation oscillator circuit to this noise has caused intolerable noise in the final count value, as illustrated in FIG. 1G. As described above, the fluctuating waveform of the system ground and the voltage threshold result in a significant cycle-to-cycle jitter, which is translated into the noise in count value through the digital counter, such as the PWM and counter module of the processing device, described below.

The embodiments described herein are configured to reduce the cycle-to-cycle jitter by controlling both the charging and discharging slew rates of the triangle waveform of the relaxation oscillator, instead of just controlling the rising edge as done conventionally in conventional relaxation oscillators. The rising edge of the triangle waveform is controlled by the programmable current source, such as a programmable current digital-to-analog converter (IDAC), as described below. In one embodiment, the falling edge of the triangle waveform is controlled by another programmable current source, such as a second IDAC, disposed in the discharge path of the relaxation oscillator. The two programmable current sources are activated using switches that are controlled by the output of one or two comparators of the relaxation oscillator. For example, a first switch that is coupled to the first IDAC is closed, activating the first IDAC to charge the sensor element at a controlled charging rate. The second switch that is coupled to the second IDAC is open, while the first switch is closed. When the voltage on the sensor element reaches a first voltage threshold (e.g., high voltage reference), the switches are toggled, opening the first switch and closing the second switch, which removes the charge from the sensor element at a controlled discharging rate until the voltage on the sensor element reaches a second voltage threshold (e.g., low voltage reference). Upon reaching the second voltage threshold, the switches are toggled again, opening the second switch and closing the first switch, which starts charging the sensor element at the controlled charging rate.

Figure 2:
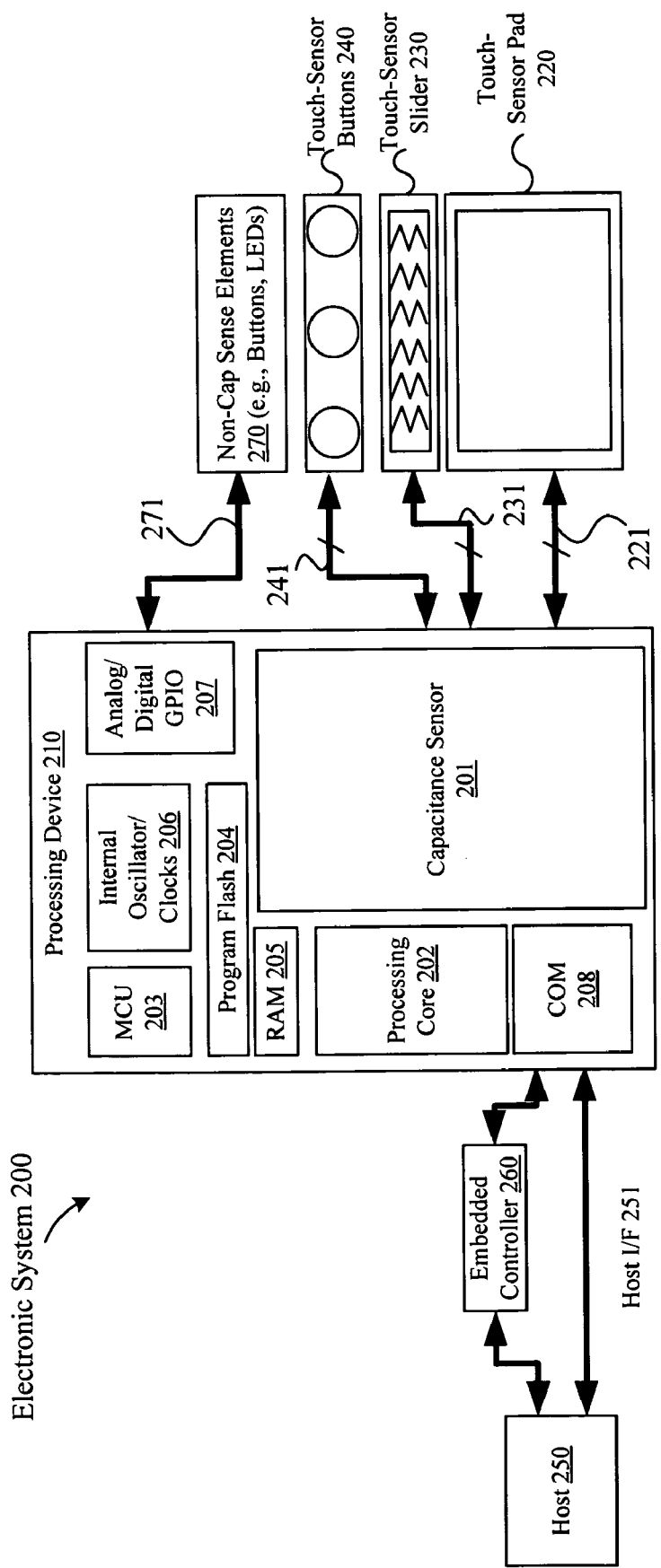
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 210 may also include memory, such as random access memory (RAM) 205 and program flash 204. RAM 205 may be static RAM (SRAM) or the like, and program flash 204 may be a non-volatile storage, or the like, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 210 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface acoustical wave (SAW), infrared, dispersive signal, and strain gauge technologies. Similarly, the operations described herein are not limited to notebook pointer operations, but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition and numeric keypad operation.

In one embodiment, the electronic system 200 includes a touch-sensor pad 220 coupled to the processing device 210 via bus 221. Touch-sensor pad 220 may include a two-dimension sensor array. The two-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes touch-sensor buttons 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact sensors. These sensor elements, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, a display, or other functional keys that do not require capacitance sensing. In one embodiment, buses 271, 241, 231, and 221 may be a single bus. Alternatively, these buses may be configured into any combination of one or more separate buses.

The processing device 210 may also provide value-added functionality such as keyboard control integration, LEDs, battery charger, and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via a low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In one embodiment, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the pointer, scroll-up, scroll-down, scroll-left, scroll-right, step Back, and step Forward. In another embodiment, the data sent to the host 250 include the position or location of the conductive object on the sensing device. Alternatively, other user interface device commands may be communicated to the host 250 from the processing device 210. These commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the pointer, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC®) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host. In another embodiment, the processing device 210 is the host.

In one embodiment, the method and apparatus described herein may be implemented in a fully self-contained touch-sensor pad, which outputs fully processed x/y movement and gesture data signals or data commands to a host. In another embodiment, the method and apparatus may be implemented in a touch-sensor pad, which outputs x/y movement data and also finger presence data to a host, and where the host processes the received data to detect gestures. In another embodiment, the method and apparatus may be implemented in a touch-sensor pad, which outputs raw capacitance data to a host, where the host processes the capacitance data to compensate for quiescent and stray capacitance, and calculates x/y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates x/y movement and detects gestures from the pre-processed capacitance data.

In one embodiment, the electronic system that includes the embodiments described herein may be implemented in a conventional laptop touch-sensor pad. Alternatively, it may be implemented in a wired or wireless keyboard integrating a touch-sensor pad, which is itself connected to a host. In such an implementation, the processing described above as being performed by the "host" may be performed in part or in whole by the keyboard controller, which may then pass filly processed, pre-processed or unprocessed data to the system host. In another embodiment, the embodiments may be implemented in a mobile handset (e.g., cellular or mobile phone) or other electronic devices where the touch-sensor pad may operate in one of two or more modes. For example, the touch-sensor pad may operate either as a touch-sensor pad for x/y positioning and gesture recognition, or as a keypad or other arrays of touch-sensor buttons and/or sliders. Alternatively, the touch-sensor pad, although configured to operate in the two modes, may be configured to be used only as a keypad.

Capacitance sensor 201 may be integrated into the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware description language, such as VHDL or Verilog, and stored to a machine-accessible medium (e.g., Flash ROM, CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above, or include additional components not listed herein.

In one embodiment, electronic system 200 may be used in a notebook computer. Alternatively, the electronic device may be used in other applications, such as a mobile handset, a personal data assistant (PDA), a kiosk, a keyboard, a television, a remote control, a monitor, a handheld multi-media device, a handheld video player, a handheld gaming device, or a control panel.

In one embodiment, capacitance sensor 201 may be a capacitive sense relaxation oscillator (CSR). The CSR may be coupled to an array of sensor elements using a current-programmable relaxation oscillator, an analog multiplexer, digital counting functions, and high-level software routines to compensate for environmental and physical sensor element variations. The sensor array may include combinations of independent sensor elements, sliding sensor elements (e.g., touch-sensor slider), and touch-sensor sensor element pads (e.g., touch pad or touch screen) implemented as a pair of orthogonal sliding sensor elements. The CSR may include physical, electrical, and software components. The physical components may include the physical sensor element itself, typically a pattern constructed on a printed circuit board (PCB) with an insulating cover, a flexible membrane, or a transparent overlay. The electrical component may include an oscillator or other means to convert a capacitance into a measured value. The electrical component may also include a counter or timer to measure the oscillator output. The software component may include detection and compensation algorithms to convert the count value into a sensor element detection decision (also referred to as switch detection decision). For example, in the case of slider sensor elements or X-Y touch-sensor sensor element pads, a calculation for finding position of the conductive object to greater resolution than the physical pitch of the sensor elements may be used.

Figure 3A:
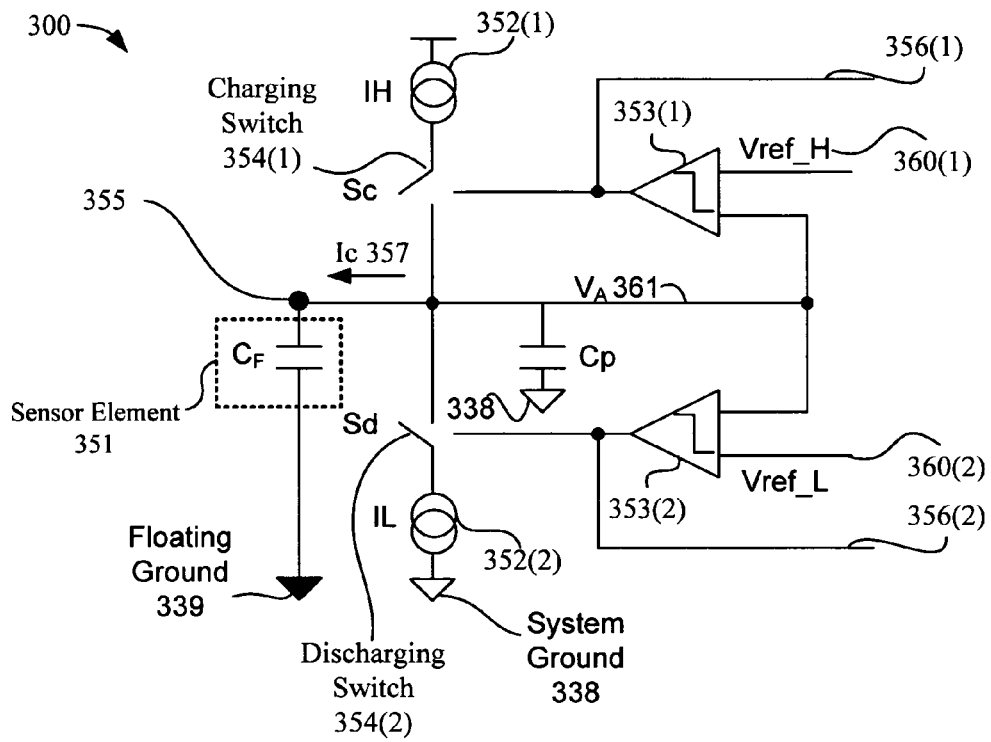
FIG. 3A illustrates a block diagram of one embodiment of a relaxation oscillator having two programmable current sources.

FIG. 3A illustrates a block diagram of one embodiment of a relaxation oscillator 300 having two programmable current sources 352(1) and 352(2). The relaxation oscillator 300 is formed by the capacitance to be measured on the sensor element 351, represented as a capacitor $C_F$, a programmable charging current source 352(1), a programmable discharging current source 352(2), two comparators 353(1) and 353(2), a charging switch 354(1), a discharging switch 354(2). The relaxation oscillator 300 is coupled to drive a charging current (Ic) 357 in a single direction onto a device under test ("DUT") capacitor, sensor element 351. The charging current Ic 357 is provided by the first programmable current source 352(1). As the charging current piles charge onto the sensor element 351, the voltage Va 361 across the capacitor increases with time as a function of the current Ic 357 and its capacitance C. The relaxation oscillator begins charging the sensor element 351, at a fixed current Ic 357, until the voltage Va 361 that is across the sensor element 351 at node 355 reaches a first reference or threshold voltage, $V_{TH}$ 360(1) (e.g., Vreg_H). At the first threshold voltage $V_{TH}$ 360(1), the relaxation oscillator 300 allows the accumulated charge at 355 to be discharged (e.g., the capacitor to "relax back). However, unlike the conventional relaxation oscillators, the relaxation oscillator controls the discharging slew rate, as well as the charging slew rate. In particular, once the voltage Va 361 reaches the first threshold voltage $V_{TH}$ 360(1), the voltage Va 361 is discharged at a discharging rate, using the second programmable current source 352(2). The second programmable current source 352(2) is disposed in the discharge path of the sensor element 351, namely between the node 355 and system ground 338. Once the sensor element 351 has been discharged so that the voltage Va 361 reaches a second voltage reference or threshold $V_{TH}$ 360(2) (e.g., Vref_L), the first programmable current source begins charging the sensor element 351 at the fixed current Ic 357 until the voltage Va 361 reaches the first voltage, $V_{TH}$ 360(1), and then the process repeats itself.

In one embodiment, as described above, the relaxation oscillator is configured to reduce the cycle-to-cycle jitter by controlling both the charging and discharging slew rates of the triangle waveform of its output. The rising edge of the triangle waveform is controlled by the first programmable current source 352(1). The falling edge of the triangle waveform is controlled by the second programmable current source 352(2). The two programmable current sources are activated using switches that are controlled by the output of one or two comparators of the relaxation oscillator. In particular, a first switch, charging switch 354(1), that is coupled to the first current source 352(1) is closed, activating the first current source 352(1) to charge the sensor element 351 at a controlled charging rate. The second switch, discharging switch 354(2), that is coupled to the second current source 352(2) is open, while the charging switch 354(1) is closed. When the voltage, Va 361, on the sensor element 351 reaches the first voltage threshold 360(1), the switches are toggled, opening the charging switch 354(1) and closing the discharging switch 354(2), which removes the charge from the sensor element 351 at a controlled discharging rate until the voltage Va reaches the second voltage threshold 360(2). Upon reaching the second voltage threshold, the switches are toggled again, opening the discharging switch 354(2) and closing the charging switch 354(1), which starts charging the sensor element 351 at the controlled charging rate again.

In one embodiment, the voltage Va 361 is compared against the two voltage references 360(1) and 360(2) using two comparators 353(1) and 353(2), as illustrated in FIG. 3A. Alternatively, the voltage Va 361 may be compared using other circuitry known by those of ordinary skill in the art. Similarly, other circuitry may be used to control the switches 354(1) and 354(2) to control the charging and discharging of the sensor element 351.

In one embodiment, the programmable current sources are programmed by setting values in a register programmable IDAC. In one embodiment, a value may be set in a single register that includes the discharge-to-charge ratio 326, which is described in more detail below. In another embodiment, individual values for the two programmable current sources may be set in two separate registers. The values may be stored in a register or in memory of the processing device 210. As describe above with respect to conventional sensing devices that use hard coded current value for the single current source, these devices can have current or circuit response variations due to chip, system, and/or board manufacturing variations, which may result in improper capacitance sensing operations. These variations, however, may be corrected using the programmable current sources 352(1) and 352(2) of relaxation oscillator 300. The programmable current sources 352(1) and 352(2) may be configured to control, and to modify the charging and discharging slew rates before or during sensing operations. For example, if the current is too low, which causes the circuit to take longer to measure the capacitance on the sensor element, the programmable current sources may be set to increase the current to a value that speeds up the capacitance measurement. The relaxation oscillator 300 may improve current or circuit response variations described above, decreasing failure rate in production quantities due to manufacturing variations.

Described below are the mathematical equations that represent the operations of FIG. 3A. In the charge period, using t0 as the start time, the following represents the voltage Va 361 over time:

$$\frac{I_H}{s} = \frac{V_a(s) - \frac{V_{noise}(t_0)}{s}}{\frac{1}{sC_f}} + \frac{V_a(s) - V_{noise}(s)}{\frac{1}{sC_p}} \quad (5)$$

$$\Rightarrow V_a(s) = \frac{I_H}{s^2(C_f + C_p)} + \frac{V_{noise}(s)C_p}{C_f + C_p} + \frac{V_{noise}(t_0)C_f}{s(C_f + C_p)}$$

$$\Rightarrow V_a(t) = \frac{I_H}{C_f + C_p}t + \frac{C_p}{C_f + C_p}V_{noise}(t) + \frac{V_{noise}(t_0)C_f}{C_f + C_p}$$

When $V_a(t) = V_{noise}(t) + V_{ref\_H}$, the charge period ends, as represented in the following equations.

$$\Rightarrow \frac{I_H}{C_f + C_p}t + \frac{C_p}{C_f + C_p}V_{noise}(t) + \frac{V_{noise}(t_0)C_f}{C_f + C_p} = V_{noise}(t) + V_{ref\_H} \quad (6)$$

$$\Rightarrow \frac{I_H}{C_f + C_p}t - \frac{C_f}{C_f + C_p}V_{noise}(t) - V_{ref\_H} + \frac{V_{noise}(t_0)C_f}{C_f + C_p} = 0$$

In discharge period, using t1 as the start time, the following represents the voltage Va 361 over time:

$$\frac{I_L}{s} = \frac{V_a(s) - \frac{V_{noise}(t_1)}{s} - \frac{V_{ref\_H}}{s}}{\frac{1}{sC_f}} + \frac{V_a(s) - V_{noise}s - \frac{V_{ref\_H}}{s}}{\frac{1}{sC_p}} \quad (7)$$

$$\Rightarrow V_a(s) = \frac{I_L}{s^2(C_f + C_p)} + \frac{V_{noise}(s)C_p}{C_f + C_p} + \frac{V_{noise}(t_1)C_f}{s(C_f + C_p)} + V_{ref\_H}$$

$$\Rightarrow V_a(t) = \frac{I_L}{C_f + C_p}(t - t_1) + \frac{C_p}{C_f + C_p}V_{noise}(t) + \frac{V_{noise}(t_1)C_f}{C_f + C_p} + V_{ref\_H}$$

When $V_a(t) = V_{noise}(t) + V_{ref\_L}$, the discharge period ends, as represented in the following equations.

$$\Rightarrow \frac{I_L}{C_f + C_p}t + \frac{C_p}{C_f + C_p}V_{noise}(t) + \frac{V_{noise}(t_1)C_f}{C_f + C_p} + V_{ref\_H} = \quad (8)$$

$$V_{noise}(t) + V_{ref\_L}$$

$$\Rightarrow \frac{I_L}{C_f + C_p}t - \frac{C_f}{C_f + C_p}V_{noise}(t) + (V_{ref\_H} - V_{ref\_L}) + \frac{V_{noise}(t_1)C_f}{C_f + C_p} = 0$$

So, the process includes calculating the charge time in a first period using the following equation:

$$\frac{I_H}{C_f + C_p}t - \frac{C_f}{C_f + C_p}V_{noise}(t) - V_{ref\_H} + \frac{V_{noise}(t_0)C_f}{C_f + C_p} = 0 \quad (9)$$

Next, the process includes calculating the discharge time in a second period using the following equation:

$$\frac{I_L}{C_f + C_p}(t - t_1) - \frac{C_f}{C_f + C_p}V_{noise}(t) + \quad (10)$$

$$(V_{ref\_H} - V_{ref\_L}) + \frac{V_{noise}(t_1)C_f}{C_f + C_p} = 0$$

Then, the process calculates the charge time in a third period using the following equation:

$$\frac{I_H}{C_f + C_p}(t - t_2) - \frac{C_f}{C_f + C_p}V_{noise}(t) - V_{ref\_H} + \frac{V_{noise}(t_2)C_f}{C_f + C_p} = 0 \quad (11)$$

Then, the process calculates the discharge time in a fourth period using the following equation:

$$\frac{I_L}{C_f + C_p}(t - t_3) - \frac{C_f}{C_f + C_p}V_{noise}(t) + \quad (12)$$

$$(V_{ref\_H} - V_{ref\_L}) + \frac{V_{noise}(t_3)C_f}{C_f + C_p} = 0$$

The process then repeats accordingly.

Figure 3B:
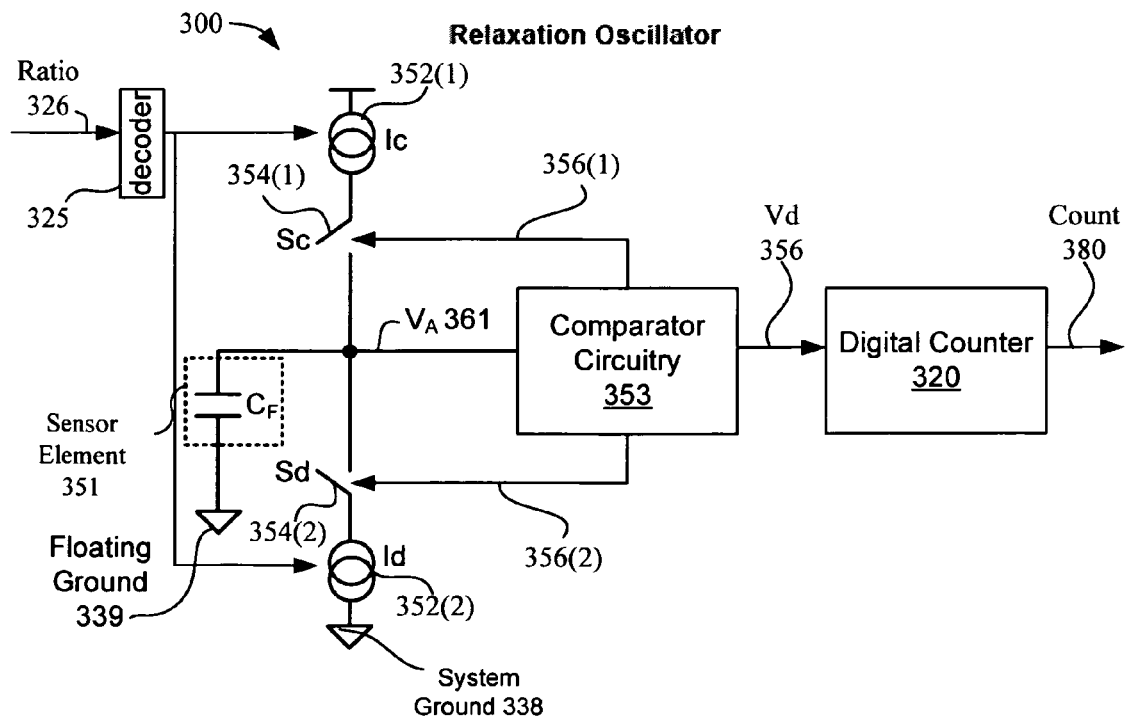
FIG. 3B illustrates a block diagram of one embodiment of relaxation oscillator coupled to a decoder and a digital counter.

FIG. 3B illustrates a block diagram of one embodiment of relaxation oscillator 300 coupled to a decoder 325 and a digital counter 320. The relaxation oscillator 300 of FIG. 3B is similar to the relaxation oscillator 300 of FIG. 3A and includes similarly-labeled components. The relaxation oscillator 300 of FIG. 3B is coupled to decoder 325. The decoder 325 is configured to receive a discharge-to-charge ratio 326. The decoder 325 receives the ratio 326 and sends signal or commands to the first and second programmable current sources 352(1) and 352(2) to set the current levels. The signal or command received by the first programmable current source 352(1) sets the current level to charge the sensor element 351 at a first current level, such as Ic 357. The sensor element 351 is charged at a charging rate that is controlled by the first programmable current source 352(1). The signal or command received by the second programmable current source 352(2) sets the current level to discharge the sensor element 351 at a second current level. The sensor element 351 is discharged at a discharging rate that is controlled by the second programmable current source 352(2).

The discharge-to-charge ratio 326 is programmable and may be set before or during operation of the sensing device. In one embodiment, the discharge-to-charge ratio 326 is approximately 1.6 to 1.0. In another embodiment, the discharge-to-charge ratio 326 is approximately 1 to 1. Alternatively, other discharge-to-charge ratios may be used. In one embodiment, the ratio 326 is stored in a register of the processing device 210. In another embodiment, the ratio 326 may be stored in memory of the processing device 210. Alternatively, the ratio 326 may be a signal or command received from another component external to the processing device 210. In one embodiment, the ratio 326 may be used by a user via a user interface, such as a command line interface (CLI), a graphical user interface (GUI), or other interfaces known by those of ordinary skill in the art.

It should be noted that although the description of the discharge-to-charge ratio is in terms of discharge to charge, another embodiment may include a ratio of the charge-to-discharge ratio.

In another embodiment, the discharge-to-charge ratio 326 may be set using separate programmable values for the first and second programmable current sources 352(1) and 352(2). Accordingly, a decoder may not be used to decode the discharge-to-charge ratio 326 for the two programmable current sources.

In one embodiment, the first programmable current source 352(1) is set to a first value. This first value may be programmable. Using the first value of the first programmable current source 352(1), the decoder 325 performs a multiplication of the first value with the ratio 326 to set a second value of the second programmable current source 352(2). Alternatively, the first and second programmable current sources 352(1) and 352(2) may be programmed using other techniques known by those of ordinary skill in the art.

The relaxation oscillator 300 of FIG. 3B is coupled to the comparator circuitry 353. As described above, the comparator circuitry 353 of the relaxation oscillator 330 may include two comparators 353(1) and 353(2) to compare the voltage Va 361 on the sensor element 351 with respect to the two voltage references, namely voltage thresholds 360(1) and 360(2). The comparator circuitry 353 may include other circuit configurations to compare the Va 361 on the sensor element 351 with respect to the two voltage references, and to control the activation and deactivation of the programmable current sources 352(1) and 352(2). The comparator circuitry 353 output a voltage Vd 356 to a digital counter 320. The output voltage Vd 356 may be the same as the voltage of the control signal that controls one of the programmable current sources, such as voltage Vb of control signal 356(1) or voltage Vc of control signal 356(2). Alternatively, other circuitry may be used to determine the output of the relaxation oscillator 300 to be measured by the digital counter 320. The digital counter 320 measures the output of the relaxation oscillator 300 and provides an output of the counts 380 measured on the sensor element 351. For example, the counts 380 represent the capacitance measured on the sensor element 351. The counts 380 may be used by decision logic to determine whether a presence of a conductive object is detected, or not, on the sensor element 351.

Figure 3C:
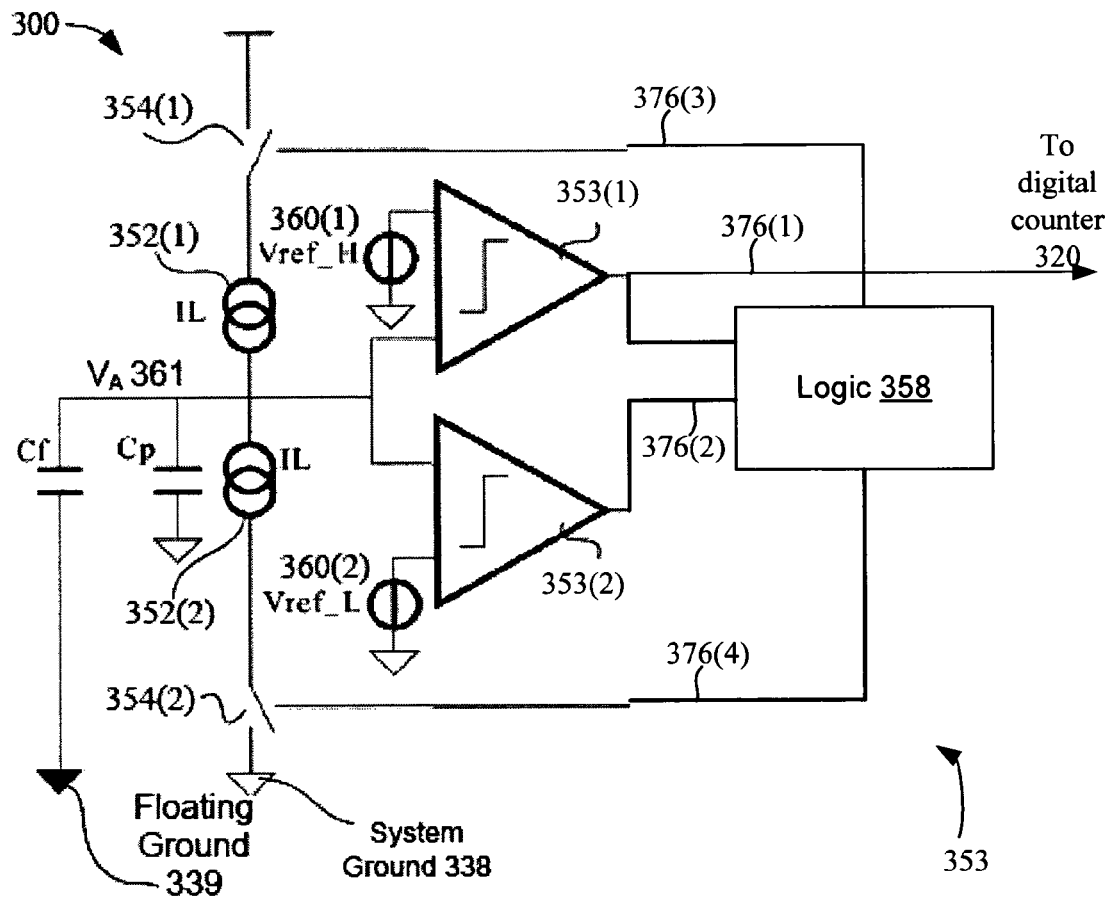
FIG. 3C illustrates a block diagram of one embodiment of a relaxation oscillator coupled to comparator circuitry.

FIG. 3C illustrates a block diagram of one embodiment of a relaxation oscillator 300 coupled to comparator circuitry 353. The relaxation oscillator 300 of FIG. 3C is similar to the relaxation oscillator 300 of FIGS. 3A and 3B and includes similarly-labeled components. The relaxation oscillator 300 of FIG. 3C is coupled to two comparators 353(1) and 353(2). The output of each comparator is coupled to logic 358. In particular, logic 358 receives the output voltage Vb 376(1) from the first comparator 353(1), and output voltage Vc 376(2) from the second comparator 353(2). Logic 358 is configured to control the switches 354(1) and 354(2) using control signals Vd 376(3) and Ve 376(4), respectively. The output voltage Vb 376(1) is also output to the digital counter 320, as described with respect to FIG. 3B. The operation of the relaxation oscillator 300 of FIG. 3C is further illustrated in the graphs of FIG. 7, which is described below.

Figure 4:
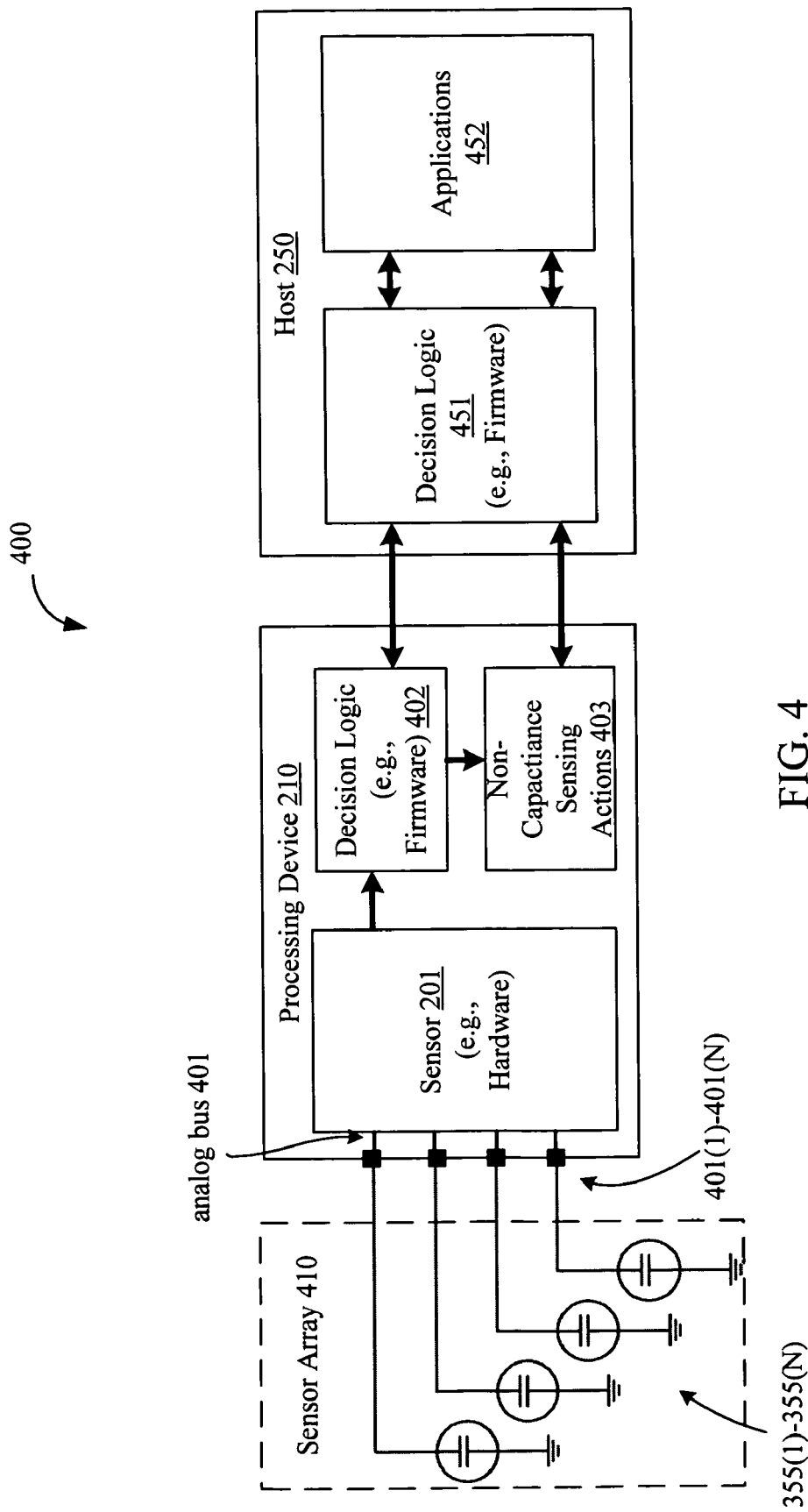
FIG. 4 illustrates a block diagram of one embodiment of an electronic device including a processing device that includes capacitance sensor for measuring the capacitance on a senor array.

FIG. 4 illustrates a block diagram of one embodiment of an electronic device 400 including a processing device that includes capacitance sensor 201 for measuring the capacitance on a sensor array 410. The electronic device 400 of FIG. 4 includes a sensor array 410, processing device 210, and host 250. Sensor array 410 includes sensor elements 355(1)-355(N), where N is a positive integer value that represents the number of rows (or alternatively columns) of the sensor array 410. Each sensor element is represented as a capacitor, as described above with respect to FIG. 3A. In one embodiment, the sensor array 410 is an array of touch-sensor buttons of a keypad. Alternatively, the sensor array 410 may be an array of touch-sensor buttons on a touch panel. The sensor array 410 is coupled to processing device 210 via an analog bus 401 having multiple pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a two-dimension sensor array including the sensor elements 355(1)-355(N), where N is a positive integer value that represents the number of sensor elements of the two-dimension sensor array. The two-dimension sensor array 410 provides output data to the analog bus 401 of the processing device 210 (e.g., via bus 221).

In one embodiment, the capacitance sensor 201 includes a selection circuit (not illustrated). The selection circuit is coupled to the sensor elements 355(1)-355(N) and the sensing circuitry of the capacitance sensor 201. Selection circuit may be used to allow the capacitance sensor to measure capacitance on multiple sensor elements (e.g., rows or columns). The selection circuit may be configured to sequentially select a sensor element of the multiple sensor elements to provide the charge current and to measure the capacitance of each sensor element. In one exemplary embodiment, the selection circuit is a multiplexer array. Alternatively, the selection circuit may be other circuitry inside or outside the capacitance sensor 201 to select the sensor element to be measured. In another embodiment, one capacitance sensor 201 may be used to measure capacitance on all of the sensor elements of the sensor array. Alternatively, multiple capacitance sensors 201 may be used to measure capacitance on the sensor elements of the sensor array. The multiplexer array may also be used to connect the sensor elements that are not being measured to the system ground. This may be done in conjunction with a dedicated pin in the GP10 port 207.

In another embodiment, the capacitance sensor 201 may be configured to simultaneously sense the sensor elements, as opposed to being configured to sequentially scan the sensor elements as described above. For example, the sensing device may include a sensor array having multiple rows and columns. The rows may be sensed simultaneously, and the columns may be sensed simultaneously.

In one exemplary embodiment, the voltages on all of the rows of the sensor array are simultaneously varied, while the voltages of the columns are held at a constant voltage, with the complete set of sampled points simultaneously giving a profile of the conductive object in a first dimension. Next, the voltages on all of the rows are held constant, while the voltages on all the rows are simultaneously varied, to obtain a complete set of sampled points simultaneously giving a profile of the conductive object in the other dimension.

In another exemplary embodiment, the voltages on all of the rows of the sensor array are simultaneously varied in a positive direction, while the voltages of the columns are varied in a negative direction. Next, the voltages on all of the rows of the sensor array are simultaneously varied in a negative direction, while the voltages of the columns are varied in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

In one embodiment, the processing device 210 further includes a decision logic block 402. The operations of decision logic block 402 may be implemented in firmware; alternatively, it may be implemented in hardware or software. The decision logic block 402 may be configured to receive the digital code or counts from the capacitance sensor 201, and to determine the state of the sensor array 410, such as whether a conductive object is detected on the sensor array, where the conductive object was detected on the sensor array (e.g., determining the X-, Y-coordinates of the presence of the conductive object), determining absolute or relative position of the conductive object, whether the conductive object is performing a pointer operation, whether a gesture has been recognized on the sensor array 410 (e.g., click, double-click, movement of the pointer, scroll-up, scroll-down, scroll-left, scroll-right, step Back, step Forward, tap, push, hop, zigzag gestures, or the like), or the like.

In another embodiment, instead of performing the operations of the decision logic 402 in the processing device 210, the processing device 201 may send the raw data to the host 250, as described above. Host 250, as illustrated in FIG. 4, may include decision logic 451. The operations of decision logic 451 may also be implemented in firmware, hardware, and/or software. Also, as described above, the host may include high-level APIs in applications 452 that perform routines on the received data, such as compensating for sensitivity differences, other compensation algorithms, baseline update routines, start-up and/or initialization routines, interpolations operations, scaling operations, or the like. The operations described with respect to the decision logic 402 may be implemented in decision logic 451, applications 452, or in other hardware, software, and/or firmware external to the processing device 210.

In another embodiment, the processing device 210 may also include a non-capacitance sensing actions block 403. This block may be used to process and/or receive/transmit data to and from the host 250. For example, additional components may be implemented to operate with the processing device 210 along with the sensor array 410 (e.g., keyboard, keypad, mouse, trackball, LEDs, displays, or the like).

At startup (or boot) the sensor elements (e.g., capacitors 355(1)-(N)) are scanned and the digital code or count values for each sensor element with no activation are stored as a baseline array ($C_P$). The presence of a finger on the sensor element is determined by the difference in counts between a stored value for no sensor element activation and the acquired value with sensor element activation, referred to here as $\Delta n$. The sensitivity of a single sensor element is approximately:

$$\frac{\Delta n}{n} = \frac{C_F}{C_P} \tag{14}$$

The value of $\Delta n$ should be large enough for reasonable resolution and clear indication of sensor element activation. This drives sensor element construction decisions. $C_F$ should be as large a fraction of $C_P$ as possible. Since $C_F$ is determined by finger area and distance from the finger to the sensor element's conductive traces (through the over-lying insulator), the baseline capacitance $C_P$ should be minimized. The baseline capacitance $C_P$ includes the capacitance of the sensor element pad plus any parasitics, including routing and chip pin capacitance.

In sensor array applications, variations in sensitivity should be minimized. If there are large differences in $\Delta n$, one sensor element may activate at 1.0 cm, while another may not activate until direct contact. This presents a non-ideal user interface device. There are numerous methods for balancing the sensitivity. These may include precisely matching on-board capacitance with PCB trace length modification, adding balance capacitors on each sensor element's PCB trace, and/or adapting a calibration factor to each sensor element to be applied each time the sensor element is measured.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

Sliding sensor elements may be used for control requiring gradual or discrete adjustments. Examples include a lighting control (dimmer), temperature control, volume control, graphic equalizer, and speed control. Slider controls may also be used for scrolling functions in menus of data. These sensor elements may be mechanically adjacent to one another. Activation of one sensor element results in partial activation of physically adjacent sensor elements. The actual position in the sliding sensor element is found by computing the centroid location of the set of sensor elements activated.

In applications for touch-sensor sliders (e.g., sliding sensor elements) and touch-sensor pads it is often necessary to determine finger (or other capacitive object) position to greater resolution than the native pitch of the individual sensor elements. The contact area of a finger on a sliding sensor element or a touch-pad is often larger than any single sensor element. In one embodiment, in order to calculate the interpolated position using a centroid, the array is first scanned to verify that a given sensor element location is valid. The requirement is for some number of adjacent sensor element signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \tag{15}$$

The calculated value may be fractional. In order to report the centroid to a specific resolution, for example a range of 0 to 100 for 12 sensor elements, the centroid value may be multiplied by a calculated or predetermined scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB may include the processing device 210 and other components, such as the connector to the host 250, necessary for operations for sensing the capacitance. These components may be on the non-sensing side of the PCB. The PCB may also includes the sensor array on the opposite side; i.e., the sensing side of the PCB. Alternatively, other multi-layer stack-ups may be used in the touchpad assembly.

The PCB may be made of standard materials, such as FR4 or Kapton™ (e.g., flexible PCB). Alternatively, the PCB may be made of non-flexible PCB material. In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield improved sensitivity. The PCB length and width is dependent on individual design requirements for the device on which the sensing device is mounted, such as a notebook or mobile handset.

The adhesive layer may be directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, the adhesive may be present on the bottom or back side of the overlay, and other thicknesses may be used. The overlay may also be provided initially in liquid form as a spray-on, spun-on, or dipped coating, which is later cured to a solid non-conductive form.

The overlay may be non-conductive material used to protect the PCB circuitry from environmental conditions and ESD, and to insulate the user's finger (e.g., conductive object) from the circuitry. Overlay can be ABS plastic, polycarbonate, glass, or polyester film, such as Mylar™ polyester film. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as a finger, to a resolution greater than that which is native. The touch-sensor pad layout pattern may be disposed to maximize the area covered by conductive material, such as copper, in relation to spaces necessary to define the rows and columns of the sensor array.

Figure 5A:
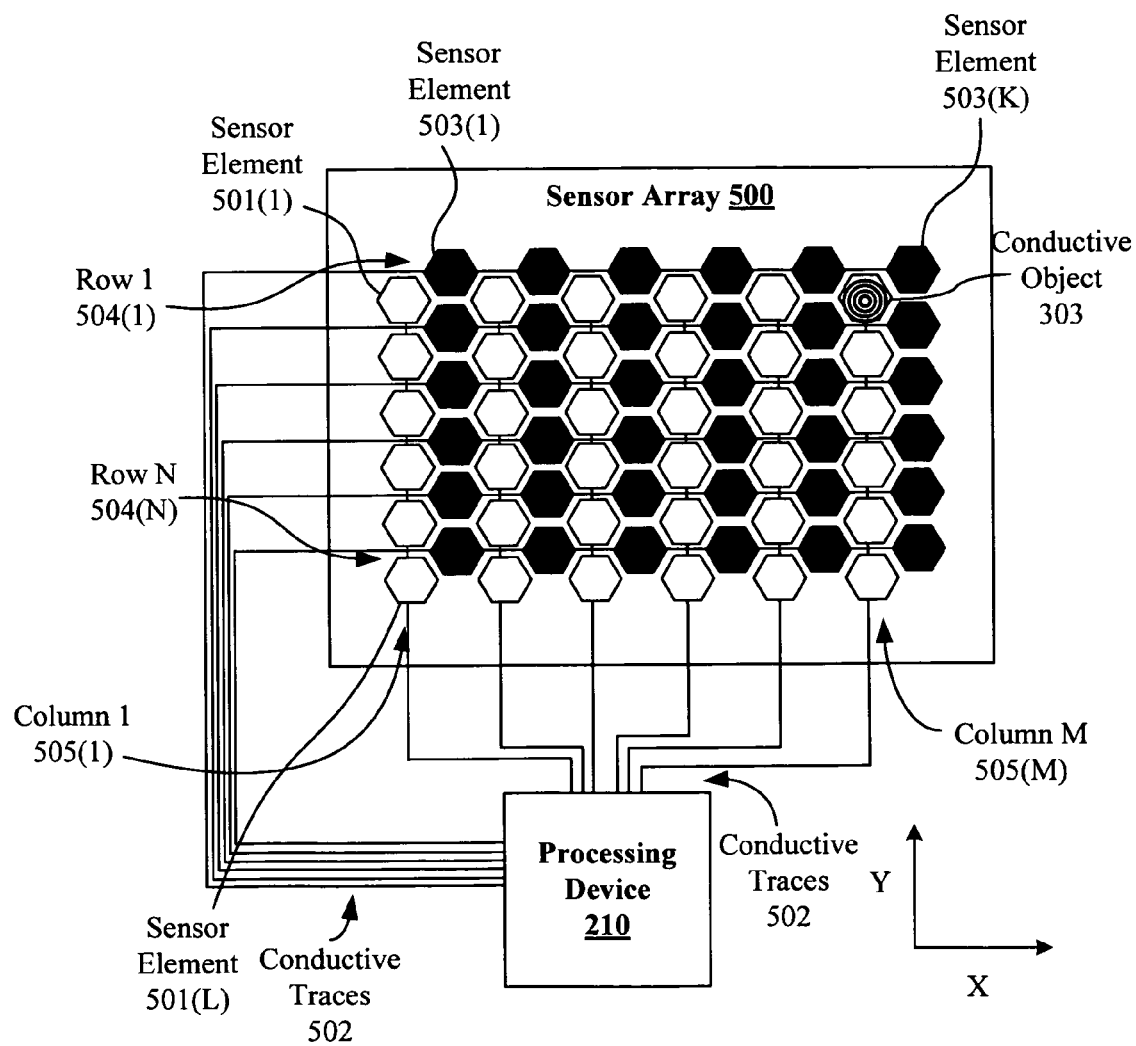
FIG. 5A illustrates a top-side view of one embodiment of a sensor array of sensor elements for detecting a presence of a conductive object on the sensor array of a touch-sensor pad.

FIG. 5A illustrates a top-side view of one embodiment of a sensor array of sensor elements for detecting a presence of a conductive object 303 on the sensor array 500 of a touch-sensor pad. Sensor array 500 includes rows 504(1)-504(N) and columns 505(1)-505(M), where N is a positive integer value representative of the number of rows and M is a positive integer value representative of the number of columns. Each row includes sensor elements 503(1)-503(K), where K is a positive integer value representative of the number of sensor elements in the row. Each column includes sensor elements 501(1)-501(L), where L is a positive integer value representative of the number of sensor elements in the column. Accordingly, the sensor array is an N×M sensor matrix. The N×M sensor matrix, in conjunction with the processing device 210, is configured to detect a position of a presence of the conductive object 303 in the x-, and y-directions. In one embodiment, the sensor array is a 1×M or N×1 sensor matrix that can be configured to operate as a touch-sensor slider.

Figure 5B:
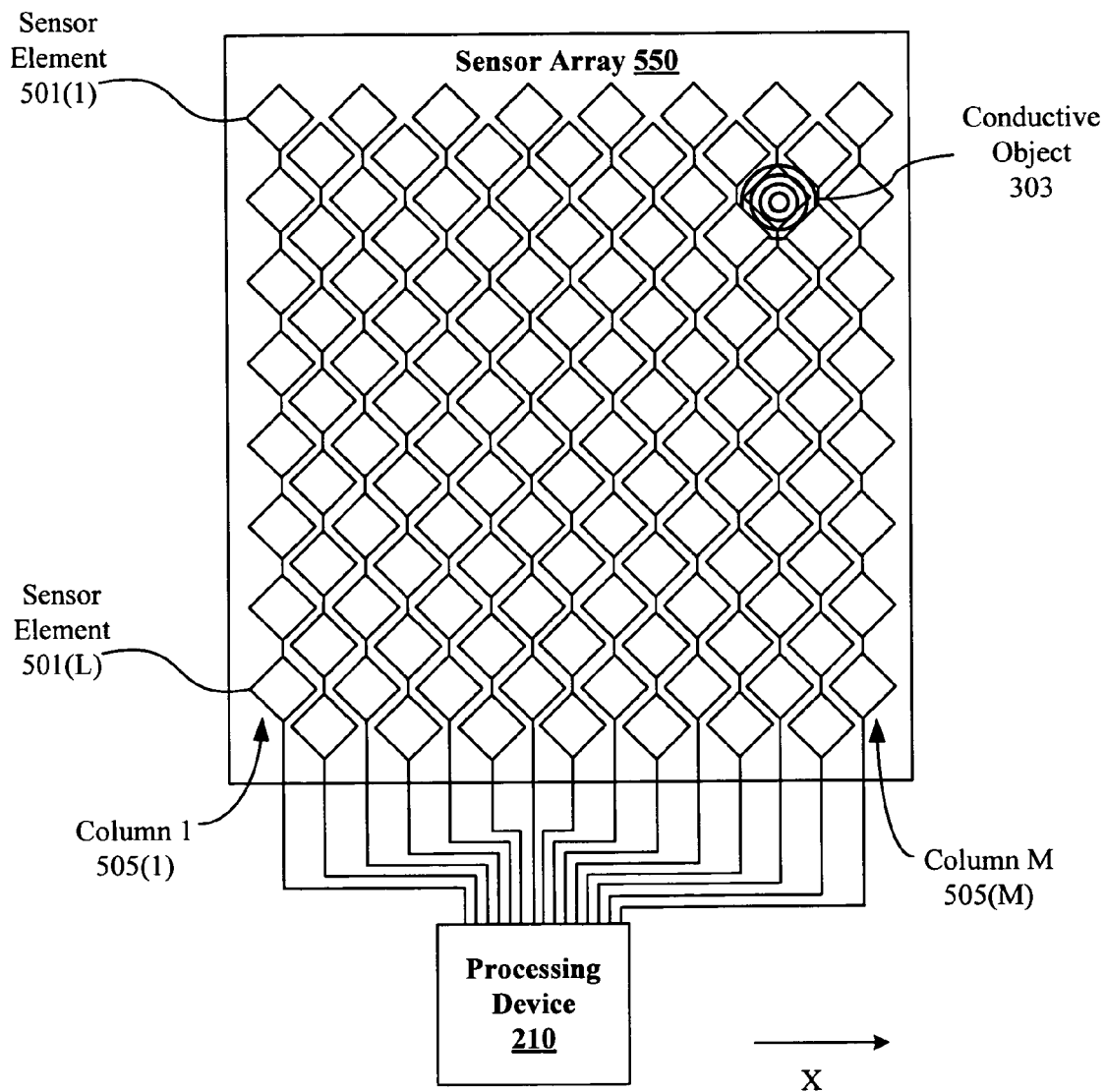
FIG. 5B illustrates a top-side view of one embodiment of a sensor array of sensor elements for detecting a presence of a conductive object on the sensor array of a touch-sensor slider.

FIG. 5B illustrates a top-side view of one embodiment of a sensor array of sensor elements for detecting a presence of a conductive object 303 on the sensor array 550 of a touch-sensor slider. Sensor array 550 includes columns 505(1)-505(M), where M is a positive integer value representative of the number of columns. Each column includes sensor elements 501(1)-501(L), where L is a positive integer value representative of the number of sensor elements in the column. Sensor array is a 1×M sensor array. The 1×M sensor array, in conjunction with the processing device 210, is configured to detect a position of a presence of the conductive object 303 in the x-direction. It should be noted that sensor array 500 may be configured to function as a touch-sensor slider 230.

Alternating sensor elements in FIG. 5A correspond to x- and y-axis elements. The y-axis sensor elements 503(1)-503(K) for each row 504(1)-504(N) are illustrated as black hexagons in FIG. 5A, and the x-axis sensor elements 501(1)-501(L) for each column 505(1)-505(M) are illustrated as white hexagons in FIG. 5A. It should be noted that other shapes may be used for the sensor elements, such as diamonds (as illustrated in FIG. 5B) or the like. In another embodiment, the columns and rows may include vertical and horizontal bars (e.g., rectangular shaped bars); however, this design may include additional layers in the PCB to allow the vertical and horizontal bars to be positioned on the PCB so that they are not in contact with one another.

Figure 5C:
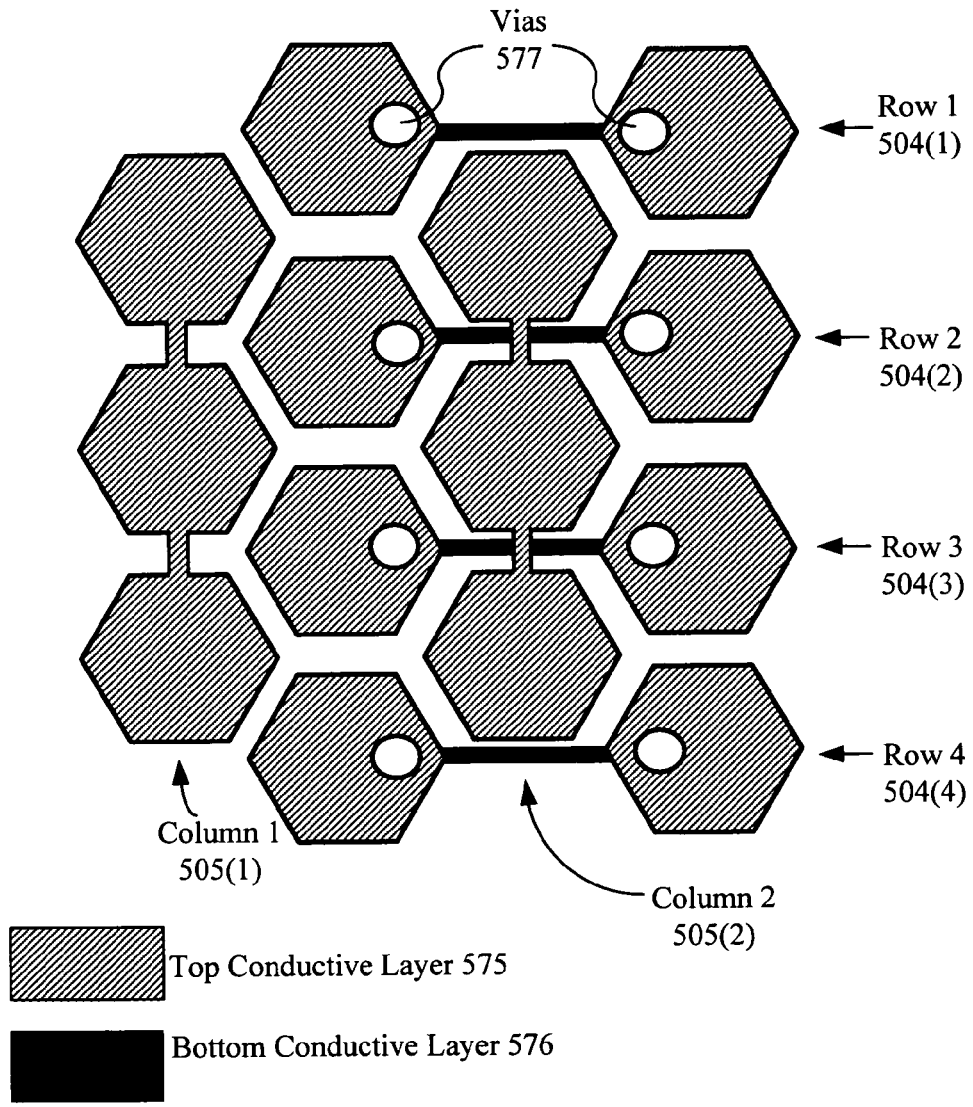
FIG. 5C illustrates a top-side view of one embodiment of a two-layer touch-sensor pad.
Figure 5D:
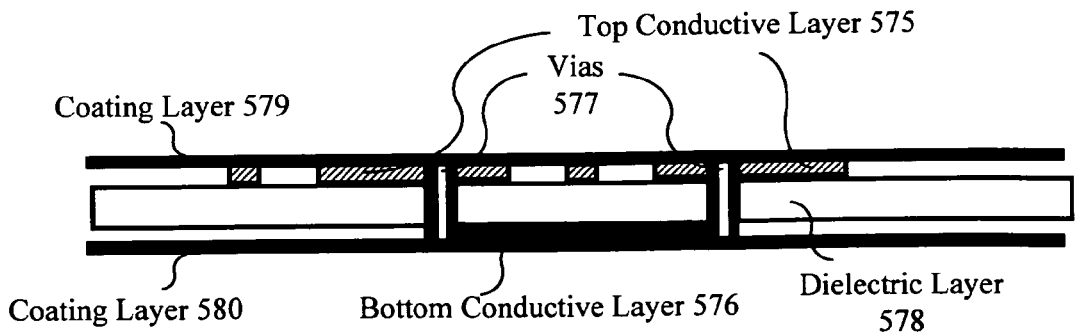
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad 220, as illustrated in FIGS. 5C and 5D, includes a portion of the first two columns 505(1) and 505(2), and the first four rows 504(1)-504(4) of sensor array 500. The sensor elements of the first column 505(1) are connected together in the top conductive layer 575, illustrated as hashed hexagonal sensor elements and hashed interconnecting traces. The sensor elements of the second column 505(2) are similarly connected in the top conductive layer 575. The hexagonal sensor elements of each column, in effect, form a chain of elements. The sensor elements of the first row 504(1) are connected together in the bottom conductive layer 576 using vias 577, illustrated as hashed hexagonal sensor elements and black interconnecting traces. The sensor elements of the second, third, and fourth rows 504(2)-504(4) are similarly connected in the bottom conductive layer 576, illustrated as hashed hexagonal sensor elements and black interconnecting traces. The hexagonal sensor elements of each row, in effect, form a chain of elements. It should be noted that other shapes may be used for the sensor elements, such as diamonds (as illustrated in FIG. 5B) or the like.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 580 are applied to the surfaces opposite to the surfaces that are coupled to the dielectric layer 578 on both the top and bottom conductive layers 575 and 576.

It should be noted that the space between coating layers 579 and 580 and dielectric layer 578, which does not include any conductive material, may be filled with the same material as the coating layers or dielectric layer. Alternatively, it may be filled with other non-conductive materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations. In another embodiment, the present embodiments may be implemented in a 1-layer configuration.

When sensor elements are not being sensed, they may be connected to ground. By surrounding the sensing device (e.g., touch-sensor pad) with a ground plane, the perimeter elements have the same fringe capacitance to ground as the interior elements. Alternatively, the individual sensor elements may be surrounded by a ground plane.

In one embodiment, an IC including the processing device 210 may be directly placed on the non-sensing side of the PCB. This placement does not necessarily have to be in the center. The processing device IC is not required to have a specific set of dimensions for a touch-sensor pad, nor a certain number of pins. Alternatively, the IC may be placed somewhere external to the PCB, or on the same side as the sensing surface but in an offset location that does not interfere with the sensing of the conductive object 303.

Figure 6A:
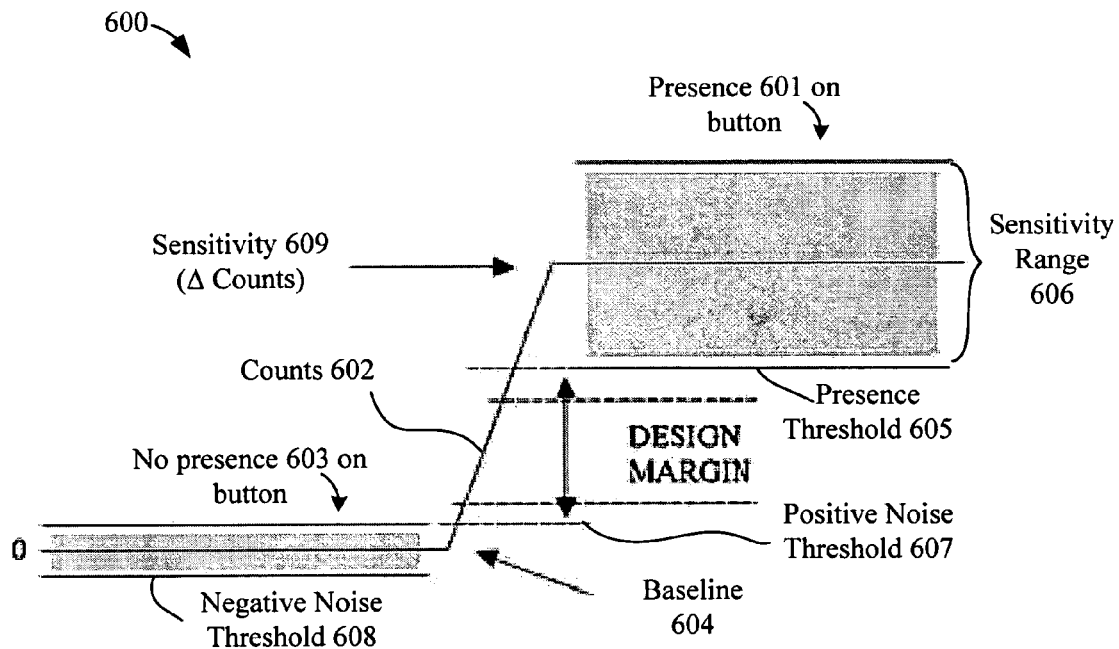
FIG. 6A illustrates a graph of a sensitivity of a single sensor element of a sensing device.

FIG. 6A illustrates a graph of a sensitivity of a single sensor element of a sensing device. Graph 600 includes the counts 602 as measured on a single sensor element of a sensing device for "no presence" 603 on the touch-sensor button, and for "presence" 601 on the touch-sensor button. "No presence" 603 is when the sensing device does not detect the presence of the conductive object, such as a finger. "No presence" 603 is detected between a range of noise. The range of noise may include a positive noise threshold 607 and a negative noise threshold 608. So long as the counts 602 are measured as being between the positive and negative thresholds 607 and 608, the sensing device detects "no presence" 603. "Presence" 601 is when the sensing device detects the presence of the conductive object (e.g., finger). "Presence" 601 is detected when the counts 602 are greater than a presence threshold 605. The presence threshold 605 indicates that a presence of a conductive object is detected on the sensing device. The sensitivity 609 (Cf/Cp) of the single button operation is such that when it detects the presence of the conductive object, the capacitance variation (Δn) is above the presence threshold 605. The sensitivity 609 may have a range, sensitivity range 606. Sensitivity range 606 may have a lower and upper limit or threshold. The lower threshold is equal to or greater than the presence threshold 605, allowing a "presence" 601 to be detected on the sensing device. The sensing device may be configured such that there is a design margin between the presence threshold 605 and the positive noise threshold 607. The sensitivity range 606 may be based on the surface area of the sensor element of the sensing device. It should be noted that the baseline 604, negative noise threshold 608, positive noise threshold 607, presence threshold 605, and sensitivity range 606 are all within a range of operation (or baseline range) of the sensing device. In other words, if the current is such that the measured counts are not within the range of operation, the processing device is unable to accurately detect the presence of the conductive object on the sensing device.

As described above, sensing devices with floating grounds are subject to high voltage AC offsets due to the sensing devices power supply, especially when used with AC/DC converters with high leakage or when the sensing device is coupled to the AC line. Capacitive sensor elements may be especially sensitive to this type of periodic noise due to the low currents and capacitance of the sensing device.

The periodic noise, such as AC noise, may introduce an AC offset in the counts measured on the sensing device. The AC noise may be caused due to an AC power adapter that is used to power the sensing device, or alternatively, from other AC power sources. Due to the AC noise, the button counts measured on the conventional sensing device may not consistently cross the presence threshold 605 to detect the presence of the conductive object (or switch activation).

Figure 6B:
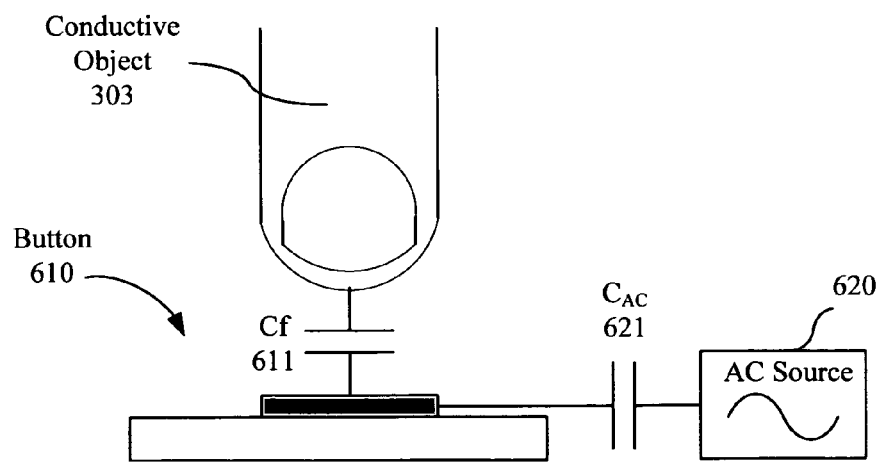
FIG. 6B illustrates the capacitance measured on a sensing device due to the conductive object and an AC power source.

FIG. 6B illustrates the capacitance measured on a sensing device due to the conductive object and an AC power source. As described with respect to FIGS. 3A and 3B, when a conductive object 303 (e.g., finger) is placed in proximity to the sensing device, such as button 610, there is capacitance variation Cf 611. When AC power source 620 is coupled to the sensing device, there is also an additional capacitance introduced on the button 610. This additional capacitance is represented in FIG. 6B as a capacitor $C_{AC}$ 621. The capacitance $C_{AC}$ 621 introduces an AC noise offset into the counts measured on the sensing device.

Figure 7:
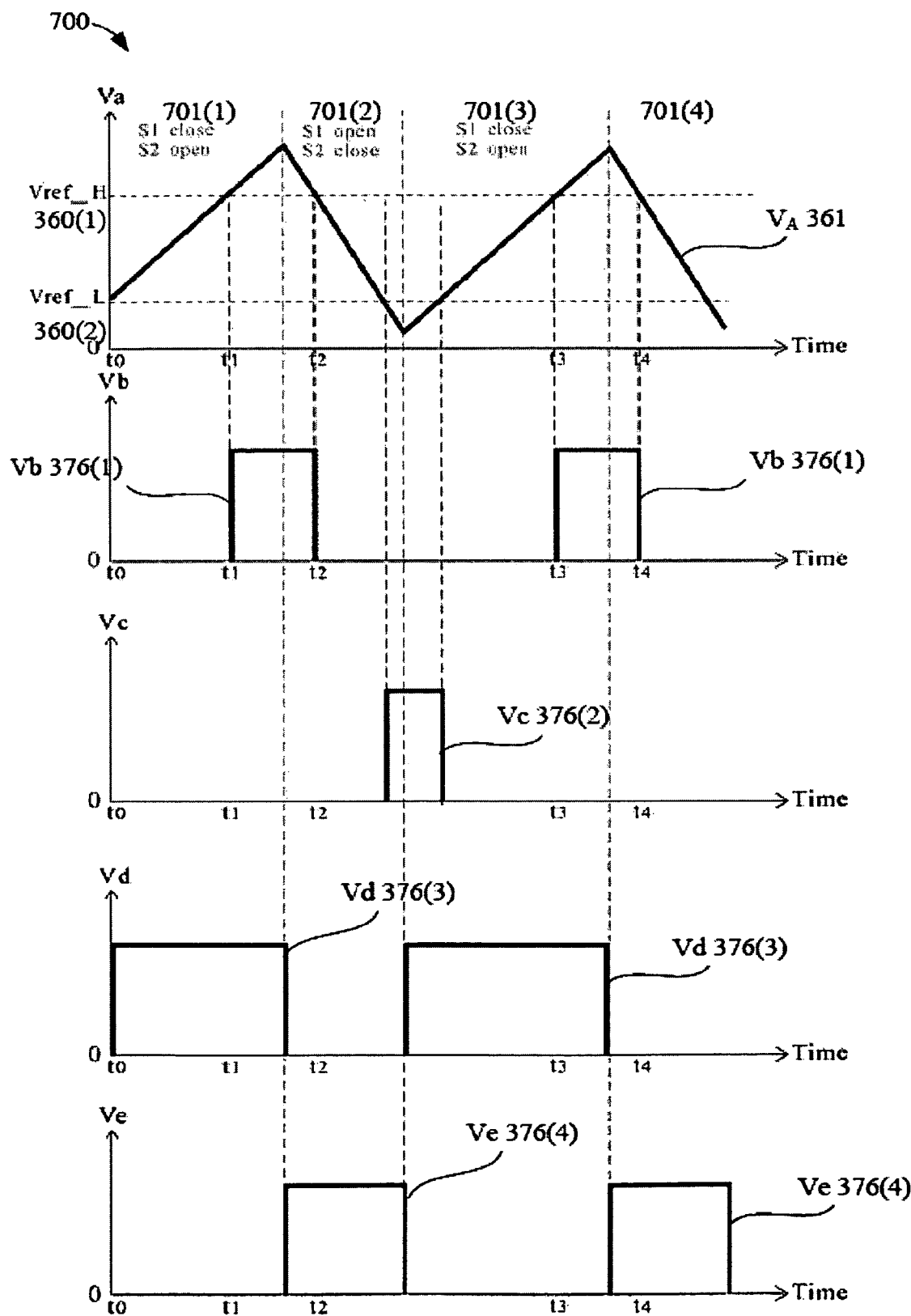
FIG. 7 illustrates a graph of one embodiment of the voltages of the relaxation oscillator and comparator circuitry of FIG. 3C.

FIG. 7 illustrates a graph 700 of one embodiment of the voltages of the relaxation oscillator 300 and comparator circuitry 353 of FIG. 3C. Graph 700 includes the first voltage threshold 360(1) (e.g., Vref_H) and the second voltage threshold 360(2) (e.g., Vref_L) between which the voltage Va 361 swings. The voltage Va 361 is controlled by the switching of the two programmable current sources 352(1) and 352(2) using charge switch 354(1) (e.g., S1) and discharging switch 354(2) (e.g., S2). The rising edge of the triangle waveform is controlled by the first programmable current source 352(1). The falling edge of the triangle waveform is controlled by the second programmable current source 352(2). The two programmable current sources are activated using switches that are controlled by the output of one or two comparators 353(1) and 353(2) of the relaxation oscillator 300. In particular, during a first period 701(1), charging switch 354(1), which is coupled to the first current source 352(1) is closed, activating the first current source 352(1) to charge the sensor element 351 at a controlled charging rate. The discharging switch 354(2), which is coupled to the second current source 352(2) is open, while the charging switch 354(1) is closed during the first period 701(1). When the voltage, Va 361, on the sensor element 351 reaches the first voltage threshold 360(1), the switches are toggled at the first of the second period 701(2), opening the charging switch 354(1) and closing the discharging switch 354(2), which removes the charge from the sensor element 351 at a controlled discharging rate until the voltage Va 361 reaches the second voltage threshold 360(2) at the end of the second period 701(2). Upon reaching the second voltage threshold, the switches are toggled again at the first of the third period 701(3), opening the discharging switch 354(2) and closing the charging switch 354(1), which starts charging the sensor element 351 at the controlled charging rate again.

At then end of the third period 701(3), the switches are toggled again, as the voltage Va 361 reaches the first voltage threshold 360(1), opening the charging switch 354(1) and closing the discharging switch 354(2), which removes the charge from the sensor element 351 at a controlled discharging rate until the voltage Va 361 reaches the second voltage threshold 360(2) at the end of the fourth period 701(4).

FIG. 7 also illustrates the voltage Vb 376(1), the voltage Vc 376(2), Vd 376(3), and Ve 376(4) of the relaxation oscillator 300 and comparator circuitry 353 of FIG. 3C. The voltage Vd 376(3), which represents the control signal from the comparator circuitry 353 to the first programmable current source 352(1), is set high during the charge period 701(1), and is set low during the discharge period 701(2). The voltage Ve 376(4), which represents the control signal from the comparator circuitry 353 to the second programmable current source 352(2), is set low during the charge period 701(1), and is set high during the discharge period 701(2). The voltage Vb 376(1), which represents the output signal of the first comparator 353(1) and the output signal that is sent to the digital counter 320, is set high during a period when the voltage Va 361 is equal to or greater than the first reference voltage (e.g., Vref_H 360(1)). The voltage Vc 376(2), which represents the output signal of the second comparator 352(2), is set high when the voltage Va 361 is equal to or less than the second reference voltage (e.g., Vref_L 360(2)). Although the voltage Vb 376(1) has been described as being output to the digital counter 320, similarly, the voltage Vc 376(2) may be output to the digital counter 320.

In another embodiment, the output voltage Vd 356 of the comparator circuitry 353 is the same as the voltage Vb 356(1). Alternatively, the output voltage Vd 356 of the comparator circuitry 353 may be other voltages, such as the same voltage as the voltage Vc 356(2).

Figure 8:
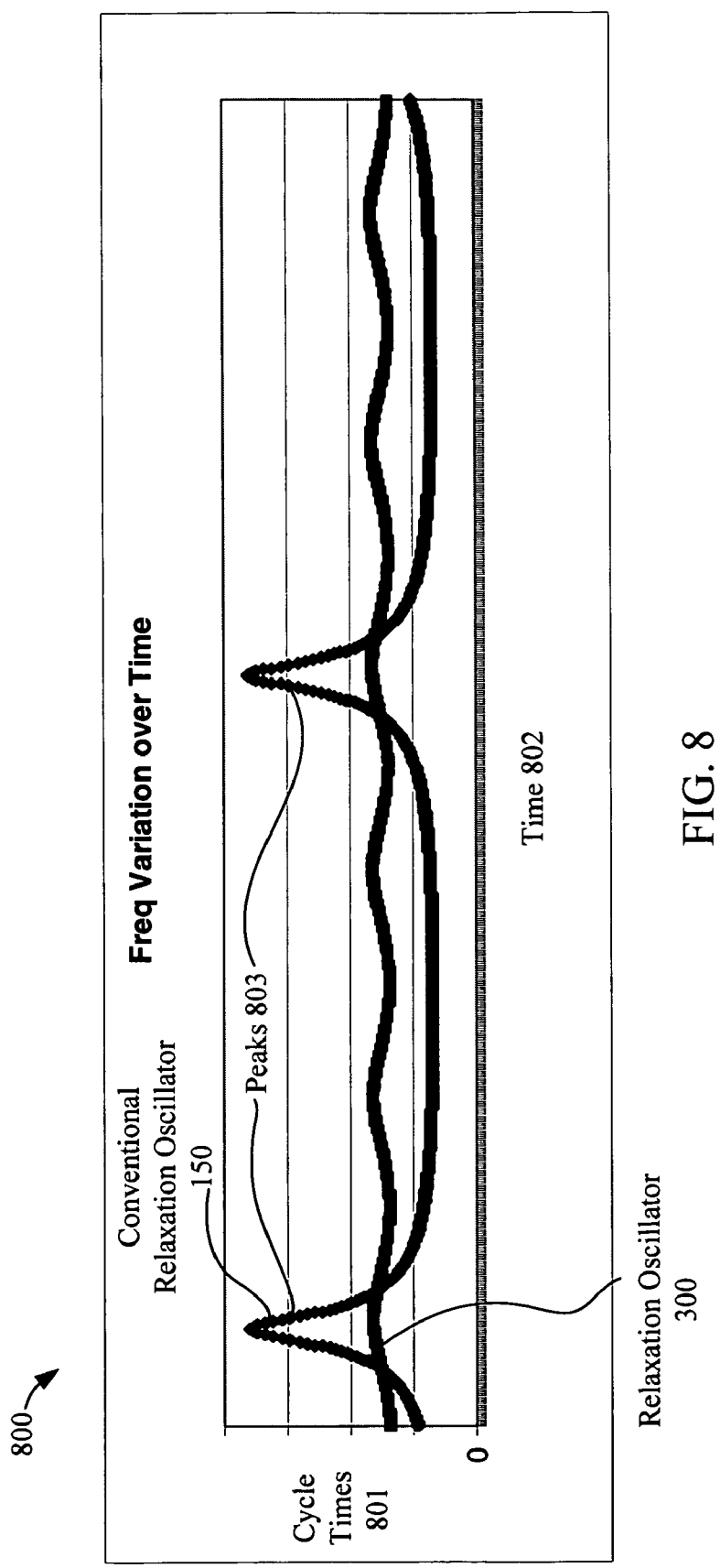
FIG. 8 illustrates a graph of one embodiment of a simulation comparing the frequency variation over time of the relaxation oscillator described herein and the conventional relaxation oscillator.

FIG. 8 illustrates a graph 800 of one embodiment of a simulation comparing the frequency variation of the cycle times over time 801 of the relaxation oscillator 300 and the conventional relaxation oscillator 150. Graph 800 includes the cycle times 801 over time 802 of both the relaxation oscillator 300 and the conventional relaxation oscillator 150. As seen in the graph 800, the conventional relaxation oscillator 150 has two spikes 803. The spikes 803 are caused by the noise of the power supply that operates at either 50 or 60 Hz. Also, as seen in the graph 800, the spikes 803 are periodic. The power supply noise, or other periodic noise, causes different charge periods on the conventional relaxation oscillator 150, resulting in the increase in cycle times 801 at the peaks 803. In comparison, the cycle times 801 of the relaxation oscillator 300 do not have the peaks 803 and maintains cycle times 801 that have less variation than the cycle times 801 of the conventional relaxation oscillator 150. The relaxation oscillator 300 is configured to reduce the amount of false-positive detections and missed-real detections of the presence of the conductive object, which results in detection algorithm stability, by reducing the effect of the power supply noise, such as 50 or 60 Hz, as well as other periodic noise. By setting the ratio of the discharge to charge rates, the noise may be reduced.

As described above, the embodiments described herein are capable of improving the noise immunity of the circuit for the low-frequency supply noise, such as 50 or 60 Hz. By setting both high and low voltage thresholds, the embodiments described herein may reduce the power consumption, which is very important in mobile applications. Also, by setting the charging and discharging rate, the cycle-to-cycle variations of the rise and fall times on the output of the relaxation oscillator 300 may be balanced, as contrasted with the different charging periods of the conventional relaxation oscillator 150. In one embodiment, the rise and fall times may be approximately equal for a 1:1 discharge-to-charge ratio. In another embodiment, the discharge-to-charge ratio may be approximately 1.6 to 1.0. Alternatively, other ratios may be used.

FIG. 9 illustrates a flow chart of one embodiment of a method 900 for setting a ratio 326 of a discharge-to-charge rate for measuring a capacitance on the sensor element 351. The method 900 includes providing a sensor element 351 of a sensing device, operation 901, and setting a ratio 326 of a discharge rate to a charge rate for measuring a capacitance on the sensor element 351, operation 902. The operation 902 of setting the ratio 326 may include setting the charging rate for introducing a charge on the sensor element 351 of the sensing device, operation 903, as well as, setting the discharge rate for removing the charge on the sensor element 351 of the sensing device.

In another embodiment, the method includes measuring the capacitance on the sensor element to detect a presence of a conductive object on the sensing device. Measuring the capacitance may include introducing a charge on the sensor element at the charging rate and removing the charge on the sensor element at the discharging rate. The charging rate and the discharging rate are set by the discharge-to-charge ratio 326. The charging and discharge rates may be decoded using decoder 325 to set the values of the two programmable current sources 352(1) and 352(2).

In another embodiment, the operation of measuring the capacitance includes comparing a voltage (e.g., Va 361) on the sensor element against a first reference voltage (e.g., Vref_H 360(1)) and a second reference voltage (e.g., Vref_L 360(2)), and switching from introducing the charge on the sensor element 351 to removing the charge on the sensor element 351 when the voltage 361 on the sensor element is equal to or greater than the first reference voltage 360(1), and switching from removing the charge on the sensor element 351 when the voltage 361 on the sensor element is equal to or greater than the second reference voltage 360(2).

In another embodiment, the method includes swinging a voltage 361 on a sensor element 351 between two reference voltage 360(1) and 360(2). In another embodiment, the method includes balancing a cycle-to-cycle variation in the charge and discharge periods caused by noise while measuring the capacitance on the sensor element 351.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising: providing a sensor element of a sensing device, the sensor element coupled to a relaxation oscillator including a first programmable current source and a second programmable current source; receiving a ratio of a discharge rate to a charge rate at a ratio decoder, the ratio decoder coupled to the first programmable current source and the second programmable current source; and setting the first programmable current source and the second programmable current source based on the received ratio.

2. The method of claim 1, wherein setting the ratio comprises:
   setting the charging rate for introducing a charge on the sensor element of the sensing device; and
   setting the discharging rate for removing the charge on the sensor element.

3. The method of claim 1, further comprising measuring the capacitance on the sensor element to detect a presence of a conductive object on the sensing device.

4. The method of claim 3, wherein measuring the capacitance comprises:
   introducing a charge on the sensor element at the charging rate; and
   removing the charge on the sensor element at the discharging rate.

5. The method of claim 4, wherein measuring the capacitance further comprises:
   comparing a voltage on the sensor element and a first reference voltage;
   comparing the voltage on the sensor element and a second reference voltage;
   switching from introducing the charge on the sensor element to removing the charge on the sensor element when the voltage on the sensor element is equal to or greater than the first reference voltage; and
   switching from removing the charge to introducing the charge on the sensor element when the voltage on the sensor element is equal to or less than the second reference voltage.

6. An apparatus, comprising:
   a sensor element of a sensing device;
   a relaxation oscillator, coupled to the sensor element, having a first programmable current source and a second programmable current source; and
   a ratio decoder coupled to the first and second programmable current sources, wherein the ratio decoder is configured to receive a ratio of a discharge rate to a charge rate, and to set the first and second programmable current sources based on the received ratio.

7. The apparatus of claim 6, wherein the relaxation oscillator further comprises:
   a first comparator coupled to one end of the sensor element for a first input and to a first voltage reference for a second input; and
   a second comparator coupled to the one end of the sensor element for a first input and to a second voltage reference for a second input.

8. The apparatus of claim 7, wherein the relaxation oscillator further comprises:
   a first switch coupled between the first programmable current source and the sensor element, wherein the first switch is controlled by an output of the first comparator; and
   a second switch coupled between the second programmable current source and the sensor element, wherein the second switch is controlled by an output of the second comparator.

9. The apparatus of claim 8, further comprising a digital counter coupled to at least one of an output of the first comparator and an output of the second comparator, wherein the digital counter is configured to count at least one of a frequency or a period of the at least one of the output of the first comparator and the output of the second comparator.

10. The apparatus of claim 9, wherein the relaxation oscillator and the ratio decoder reside in a processing device, wherein the processing device is configured to measure a capacitance on the sensor element.

11. The apparatus of claim 10, wherein the processing device is configured to detect a presence of a conductive object on the sensing device.

12. The apparatus of claim 6, wherein the relaxation oscillator is configured to place a charge on the sensor element until a voltage on the sensor element is equal to or greater than a first threshold and to decrease the voltage on the sensor element until the voltage on the sensor element is equal to or less than a second threshold.

13. The apparatus of claim 12, wherein the relaxation oscillator comprises:
   a first voltage supply coupled to the relaxation oscillator to provide a first voltage reference as the first threshold; and
   a second voltage supply coupled to the relaxation oscillator to provide a second voltage reference as the second threshold.

14. The apparatus of claim 6, wherein first programmable current source is configured to introduce a charge on the sensor element based on the set charging rate, and the second programmable current source is configured to decrease the charge on the sensor element based on the set discharging rate.

15. The apparatus of claim 14, wherein the relaxation oscillator comprise:

a first switch coupled between the first programmable current source and the sensor element; and a second switch coupled between the second programmable current source and the sensor element, and wherein the first switch is opened and the second reset switch is closed when a voltage on the sensor element is equal to or greater than a first reference voltage, and wherein the first switch is closed and the second reset switch is opened when the voltage on the sensor element is equal to or less than a second reference voltage.

16. The apparatus of claim 6, wherein the relaxation oscillator further comprises a selection circuit coupled to the sensor element and one or more additional sensor elements, and wherein the selection circuit is configured to select either the sensor element or one of the one or more additional sensor elements to measure a capacitance on the selected sensor element.

17. The apparatus of claim 6, wherein the ratio of the discharge rate to the charge rate is approximately a 1 to 1 ratio.

18. The apparatus of claim 6, wherein the ratio of the discharge rate to the charge rate is approximately 1.6 to 1 ratio.

* * * * *